United States Patent
Kumar et al.

(10) Patent No.: US 12,008,579 B1
(45) Date of Patent: Jun. 11, 2024

(54) FRAUD DETECTION USING EMOTION-BASED DEEP LEARNING MODEL

(71) Applicant: Wells Fargo Bank, N.A., San Francisco, CA (US)

(72) Inventors: Abhishek Kumar, Bangalore (IN); Dipanjan Deb, Bangalore (IN); Julia A Kosheleva-Coates, San Francisco, CA (US); Amit Agarwal, Bangalore (IN); Naveen Gururaja Yeri, Bangalore (IN)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/397,494

(22) Filed: Aug. 9, 2021

(51) Int. Cl.
*G06Q 30/016* (2023.01)
*G06N 3/08* (2023.01)

(52) U.S. Cl.
CPC ............. *G06Q 30/016* (2013.01); *G06N 3/08* (2013.01)

(58) Field of Classification Search
CPC ............................... G06Q 30/016; G06N 3/08
See application file for complete search history.

(56) References Cited

U.S. PATENT DOCUMENTS

| | | |
|---|---|---|
| 7,580,512 B2 | 8/2009 | Batni et al. |
| 8,054,964 B2 | 11/2011 | Flockhart et al. |
| 8,983,975 B2 | 3/2015 | Kenton et al. |
| 9,015,046 B2 | 4/2015 | Pereg et al. |

(Continued)

FOREIGN PATENT DOCUMENTS

| | | |
|---|---|---|
| CA | 2957716 C | 11/2016 |
| CA | 2988282 A1 | 6/2018 |

(Continued)

OTHER PUBLICATIONS

Hsiao et al., "A novel framework for customer complaint management," The Service Industries Journal: vol. 36, No. 13-14, Feb. 12, 2016, 675-698 pages.

(Continued)

*Primary Examiner* — Fahd A Obeid
*Assistant Examiner* — Avia Salman
(74) *Attorney, Agent, or Firm* — Shumaker & Sieffert, P. A.

(57) ABSTRACT

Techniques are described for determining a likelihood that a customer communication is fraudulent using one or more machine learning models. For example, a computing system includes a memory and one or more processors in communication with the memory. The one or more processors are configured to: receive a set of emotion factor values for communication data of a current communication associated with a customer, wherein each emotion factor value indicates a measure of a particular emotion factor in the current communication; classify, using an emotion variance model running on the one or more processors, the current communication into an emotional fraud category based on the set of emotion factor values for the current communication associated with the customer; and determine a risk score for the current communication indicative of a probability that the current communication is fraudulent based on at least the emotional fraud category for the current communication.

22 Claims, 7 Drawing Sheets

(56) References Cited

U.S. PATENT DOCUMENTS

| | | | |
|---|---|---|---|
| 9,026,476 | B2 | 5/2015 | Bist |
| 9,093,081 | B2* | 7/2015 | Laperdon ............... G10L 25/63 |
| 9,129,290 | B2* | 9/2015 | Kannan ............... G06Q 10/067 |
| 9,299,268 | B2 | 3/2016 | Aravkin et al. |
| 9,483,768 | B2 | 11/2016 | Singh |
| 9,536,269 | B2 | 1/2017 | Chang et al. |
| 9,710,459 | B2 | 7/2017 | Baldwin et al. |
| 9,824,403 | B2 | 11/2017 | Gangadharaiah et al. |
| 9,967,400 | B2 | 5/2018 | Eftekhari et al. |
| 10,111,611 | B2 | 10/2018 | El Kaliouby et al. |
| 10,360,526 | B2 | 7/2019 | Balakrishnan et al. |
| 10,410,125 | B1 | 9/2019 | Finkelstein et al. |
| 10,489,451 | B2 | 11/2019 | Fujita et al. |
| 10,489,845 | B2 | 11/2019 | Mullakkara Azhuvath et al. |
| 10,691,407 | B2 | 6/2020 | Yoo et al. |
| 10,728,393 | B2 | 7/2020 | Eftekhari et al. |
| 10,748,644 | B2 | 8/2020 | Shriberg et al. |
| 10,896,428 | B1 | 1/2021 | Balasubramaniam et al. |
| 11,451,666 | B1 | 9/2022 | Biswas |
| 2001/0056349 | A1* | 12/2001 | St. John ............... G07C 9/37 704/270 |
| 2003/0097329 | A1 | 5/2003 | Nabe et al. |
| 2003/0130933 | A1 | 7/2003 | Huang et al. |
| 2005/0175167 | A1 | 8/2005 | Yacoub et al. |
| 2006/0285665 | A1* | 12/2006 | Wasserblat ......... G06Q 20/4016 704/E17.002 |
| 2008/0086690 | A1 | 4/2008 | Verma et al. |
| 2009/0222313 | A1 | 9/2009 | Kannan et al. |
| 2013/0035983 | A1 | 2/2013 | Kursar et al. |
| 2014/0163960 | A1 | 6/2014 | Dimitriads et al. |
| 2014/0365272 | A1 | 12/2014 | Hurewitz |
| 2015/0213002 | A1 | 7/2015 | Gou et al. |
| 2016/0335252 | A1 | 11/2016 | Brunet et al. |
| 2017/0228745 | A1 | 8/2017 | Garcia et al. |
| 2019/0050875 | A1* | 2/2019 | McCord ............... G06F 40/242 |
| 2019/0147043 | A1 | 5/2019 | Moskowitz |
| 2019/0318219 | A1 | 10/2019 | Arora et al. |
| 2019/0325897 | A1 | 10/2019 | Liu et al. |
| 2020/0013071 | A1 | 1/2020 | Sri et al. |
| 2020/0020454 | A1 | 1/2020 | McGarvey et al. |
| 2020/0074156 | A1 | 3/2020 | Janumpally et al. |
| 2020/0082056 | A1* | 3/2020 | Hasegawa ........... G06F 18/2185 |
| 2020/0106882 | A1 | 4/2020 | Fang et al. |
| 2020/0160356 | A1 | 5/2020 | Mccord |
| 2020/0294670 | A1 | 9/2020 | Kotikela et al. |
| 2021/0192332 | A1 | 6/2021 | Gangotri et al. |
| 2021/0350385 | A1 | 11/2021 | Ellison et al. |
| 2022/0103589 | A1 | 3/2022 | Shen |

FOREIGN PATENT DOCUMENTS

| | | |
|---|---|---|
| CN | 103811009 A | 5/2014 |
| CN | 102831184 B | 3/2016 |
| CN | 106022676 A | 10/2016 |
| CN | 106530127 A | 3/2017 |
| CN | 106539804 A | 3/2017 |
| CN | 107908782 A | 4/2018 |
| CN | 108108352 A | 6/2018 |
| CN | 108108433 A | 6/2018 |
| CN | 110516593 A | 11/2019 |
| CN | 111048075 A | 4/2020 |
| CN | 111049998 A | 4/2020 |
| CN | 111324865 A | 6/2020 |
| CN | 111767736 A | 10/2020 |
| CN | 112182361 A | 1/2021 |
| IN | 201841033441 A | 3/2020 |
| JP | 2018180628 A | 11/2018 |
| KR | 101600509 B1 | 2/2016 |
| KR | 20190053982 A | 5/2019 |
| KR | 20200005753 A | 1/2020 |
| WO | 2015087323 A1 | 6/2015 |
| WO | 2019222742 A1 | 5/2019 |
| WO | 2020056519 A1 | 3/2020 |

OTHER PUBLICATIONS

Mcquilken et al., "The influence of guarantees, active requests to voice and failure severity on customer complaint behavior," International Journal of Hospitality Management, vol. 30, Issue 4, Dec. 2011, 953-962 pages.

Tsai et al., "Financial keyword expansion via continuous word vector representations", In Proceedings of the 2014 Conference on Empirical Methods in Natural Language Processing (EMNLP), Oct. 25-29, 2014, 1453-1458 pp.

Luo et al., "Beyond Polarity: Interpretable Financial Sentiment Analysis with Hierarchical Query-driven Attention", IJCAI'18: Proceedings of the 27th International Joint Conference on Artificial Intelligence, Jul. 13, 2018, 4244-4250 pp.

Wang et al., "Financial sentiment analysis for risk prediction", International Joint Conference on Natural Language Processing, Oct. 14-18, 2013, 802-808 pp.

Mohammad, "Obtaining reliable human ratings of valence, arousal, and dominance for 20,000 english words", Association for Computational Linguistics, Jul. 15-20, 2018, 11 pp.

"Loughran-McDonald Sentiment Word Lists Financial dictionary", Retrieved from https://sraf.nd.edu/textual-analysis/resources/, Nov. 30, 2020, 4 pp.

Chew-Yean, "Emotion Detection and Recognition from Text Using Deep Learning" Devblogs, Nov. 29, 2015, 8 pp.

"Emotion Analysis", Komprehend, retrieved from https://www.paralleldots.com/emotion-analysis, Nov. 30, 2020, 8 pp.

Park et al., "Emotion Recognition from Text Stories Using an Emotion Embedding Model", IEEE, Apr. 20, 2020, 5 pp.

U.S. Appl. No. 16/781,620, filed Feb. 4, 2020, naming inventors Mann et al.

U.S. Appl. No. 17/338,167, filed Jun. 3, 2021, naming inventors Kumar et al.

U.S. Appl. No. 17/359,102, filed Jun. 25, 2021, naming inventors Kumar et al.

"Hyper-Personalization: The Next Wave of Customer Engagement", SmartKarrot Inc., Retrieved from: https://medium.com/smartkarrot/hyper-personalization-the-next-wave-of-customer-engagement-9e68c7a7c9ad, Mar. 15, 2019, 8 pp.

U.S. Appl. No. 17/456,334, filed Nov. 23, 2021, naming inventors Kumar et al.

U.S. Appl. No. 17/647,970, filed Jan. 13, 2022, naming inventors Kumar et al.

U.S. Appl. No. 17/647,971, filed Jan. 13, 2022, naming inventors Kumar et al.

Schrauwen, "Machine Learning Approaches to Sentiment Analysis Using the Dutch Netlog Corpus", Computational Linguistics & Psycholinguistics Technical Report Series, Jul. 2010, 78 pp.

Lewenberg et al., "Using emotions to predict user interest areas in online social networks", 2015 IEEE International Conference on Data Science and Advanced Analytics (DSAA), IEEE, Oct. 2015, pp. 1-10.

Mostafa, "Modelling and Analysing Behaviours and Emotions via Complex User Interactions," Feb. 20, 2019, 176 pages.

* cited by examiner

FRAUD DETECTION USING EMOTION-BASED DEEP LEARNING MODEL

TECHNICAL FIELD

The disclosure relates to computing systems, and more specifically, computing systems executing models configured to detect patterns.

BACKGROUND

A customer service contact center is a facility configured to handle incoming communications from customers or potential customers of a business or organization. One function of the contact center is to identify potentially fraudulent communications. Although many communications can be handled through online interactions (e.g., via websites, email, or mobile applications), for some businesses, a contact center may be regarded as necessary. A contact center may include one or more message analysis systems and one or more agent desktop systems used by a number of human agents that are representatives of the organization.

Sentiment analysis seeks to extract subjective information, such as affective states, from communications. Generally, an algorithm assigns an emotional scale to certain words or phrases in text to classify the polarity of the text as a whole. The polarity is expressed as either positive, negative, or neutral.

SUMMARY

In general, this disclosure describes techniques for identifying potentially fraudulent communications using an emotion-based indexer deep learning model and an emotion classifier for customer communications associated with a business or organization. More specifically, a computing system may receive data associated with one or more customer communications (e.g., text and annotated data from text-, voice-, and/or video-based customer communications, such as service inquiries). The computing system applies the data for a customer communication as input to the emotion-based indexer deep learning model to determine a set of emotion factor values (e.g., numerical values representing emotion factors) for the customer communication as output. The computing system then applies the emotion factor values for the customer communication, along with historical emotion factor values for previous customer communications as input to a use case specific emotion classifier.

In accordance with the techniques described in this disclosure, the emotion classifier may comprise an emotion variance model configured to determine whether a change in the emotion factor values of a current customer communication compared to historic customer communications is indicative of fraud. In some examples, the emotion variance model may determine that a specific pattern of emotion factor values for a current customer communication is indicative of fraud. Based at least in part on the variance model's determination that the current communication is indicative of fraud, the computing system may flag the communication as fraudulent. In this way, the business or organization may detect fraudulent communications that may otherwise go unnoticed.

Fraud detection systems often miss fraudulent communications and misidentify legitimate communications as fraudulent. By analyzing the emotive content of communications, a fraud detection system may become more accurate at distinguishing legitimate communications from fraudulent ones.

In some examples, a computing system includes a memory and one or more processors in communication with the memory and configured to: receive a set of emotion factor values for communication data of a current communication associated with a customer, wherein each emotion factor value indicates a measure of a particular emotion factor in the current communication; classify, using an emotion variance model running on the one or more processors, the current communication into an emotional fraud category based on the set of emotion factor values for the current communication associated with the customer; and determine a risk score for the current communication indicative of a probability that the current communication is fraudulent based on at least the emotional fraud category for the current communication.

In some examples, this disclosure is directed to a method comprising: receiving, by one or more processors, a set of emotion factor values for communication data of a current communication associated with a customer, wherein each emotion factor value indicates a measure of a particular emotion factor in the current communication; classifying, using an emotion variance model running on the one or more processors, the current communication into an emotional fraud category based on the set of emotion factor values for the current communication associated with the customer; and determining a risk score for the current communication indicative of a probability that the current communication is fraudulent based on at least the emotional fraud category for the current communication.

In some examples, this disclosure is directed to a computer-readable medium comprising instructions that, when executed, cause one or more processors to: receive a set of emotion factor values for communication data of a current communication associated with a customer, wherein each emotion factor value indicates a measure of a particular emotion factor in the current communication; classify, using an emotion variance model running on the one or more processors, the current communication into an emotional fraud category based on the set of emotion factor values for the current communication associated with the customer; and determine a risk score for the current communication indicative of a probability that the current communication is fraudulent based on at least the emotional fraud category for the current communication.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
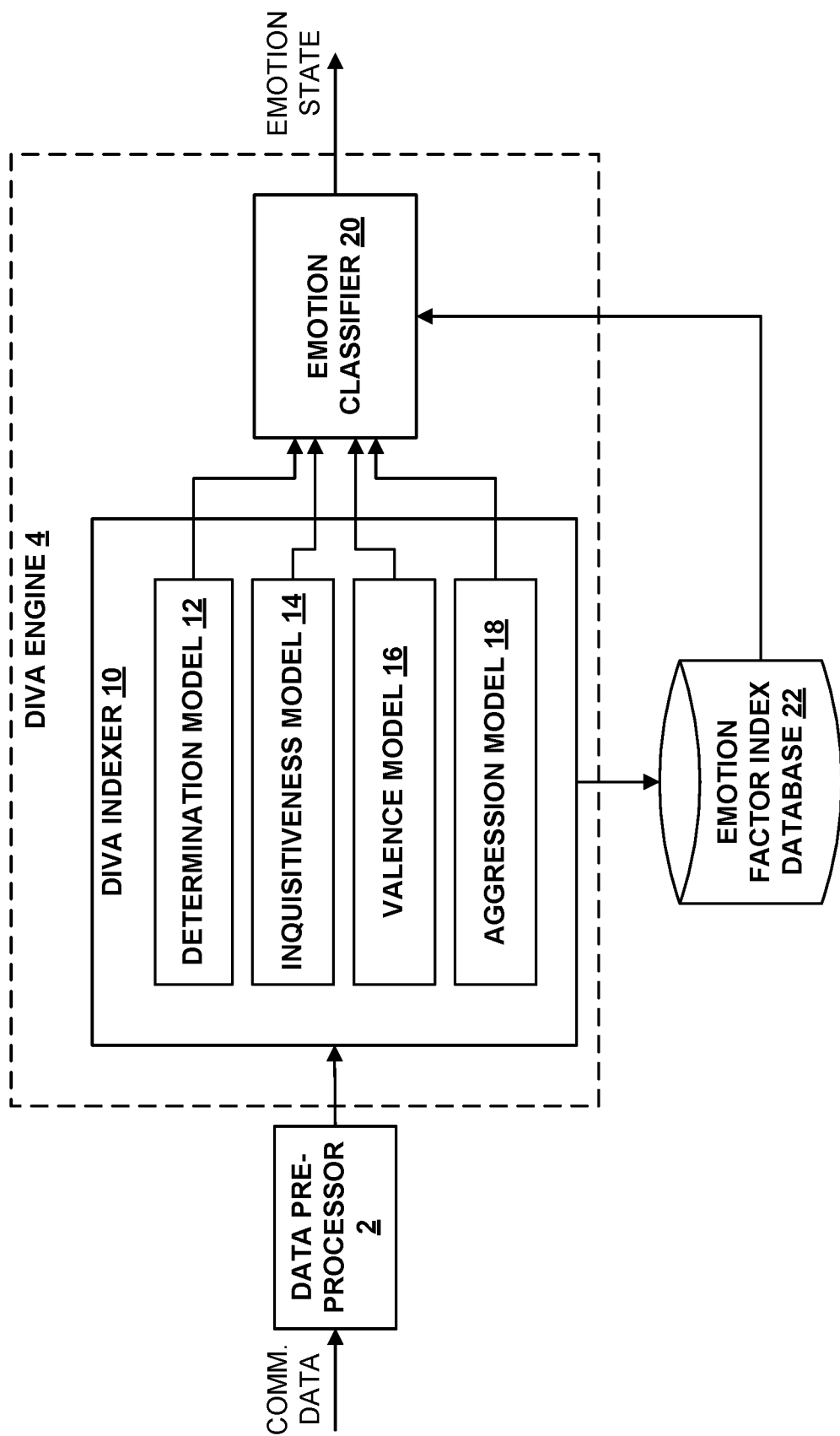
FIG. 1 is a block diagram illustrating an example operation of an emotion classification engine in accordance with techniques of this disclosure.

FIG. 1 is a block diagram illustrating an example operation of an emotion classification engine in accordance with techniques of this disclosure.

The emotion classification engine illustrated in FIG. 1 is DIVA engine 4, which refers to the four emotion factor values of Determination, Inquisitiveness, Valence, and Aggression that the engine is configured to determine from input communication data and use to classify the communication data as being associated with a given emotion state. In the illustrated example of FIG. 1, DIVA engine 4 includes a DIVA indexer 10 and an emotion classifier 20. The DIVA indexer 10 may comprise four machine learning models trained to output the four different emotion factor values for communication data. The emotion factor values may be represented as numerical numbers (e.g., between 0 and 1, between −2 and 2, or the like) reflecting the intensity of a specified emotion present in the communication data. For communication data representing a customer communication, for example, a determination model 12 may be trained to output a determination value, an inquisitiveness model 14 may be trained to output an inquisitiveness value, a valence model 16 may be trained to output a valence value, and an aggression model 18 may be trained to output an aggression value. DIVA indexer 10 may output the four emotion factor values to an emotion classifier 20, which may be a machine learning model or a rule-based model, configured to classify the communication data into an associated emotion state (e.g., angry, curious, happy, etc.) based on the four emotion factor values.

DIVA engine 4 may be supported on one or more servers or other computing systems or devices within an organization network. For example, DIVA engine 4 may comprise software code executing on processors or processing circuitry of one or more computing systems that may be included in a centralized or distributed network of disparate computing devices. In some examples, one or more of the machine learning models 12, 14, 16, and 18 and emotion classifier 20 may each be supported by different computing systems or devices within the network. In other examples, DIVA indexer 10 may be supported on the same computing system, and emotion classifier 20 may be supported on the same computing system or a different computing system within the network.

Upon receipt of communication data representing a customer communication for processing, data pre-processor 2 may perform preprocessing to prepare the communication data for application to the DIVA engine 4 machine learning models. The communication data representing a customer communication may also be saved to a database in memory. The four machine learning models 12, 14, 16, and 18 of the DIVA indexer 10 are trained to recognize certain emotion factors within communication data and output emotion factor values reflecting the presence and intensity of those emotions. The emotion factor values output from DIVA indexer 10 may be saved to an emotion factor index database 22 and an ID may be assigned to the communication data in memory to associate the communication data with the emotion factor values. The saved emotion factor values may also be associated with a customer who is the source of the communication data. In some examples, the emotion classifier 20 may also retrieve historic, saved emotion factor values for previous communication data associated with the customer from the emotion factor index database 22 as additional input to determine an emotion state of current communication data of the customer. The use of historic emotion factor values of the customer may enable emotion classifier 20 to more accurately classify an emotion state of a customer associated with the current communication data by identifying trends or sudden changes in the emotion factor values of the customer over time. Emotion states may be saved to an emotion state database (not shown in FIG. 1) and associated with the respective communication data, originating customer, and/or emotion factor values.

In some examples, instead of only relying on the specific customer's own historic emotion factor values, emotion classifier 20 may use historic emotion factor values associated with a grouping or profile of customers that includes the specific customer. For example, customer profiles may be identified for groups of customers based on geographical location, education level, age, profession, socioeconomic status, or other categorization. The use of customer profiles may provide a larger historic data set from which emotion classifier 20 may learn to identify emotional trends over time.

Conventional sentiment analysis systems generally classify communication data as being positive, neutral, or negative. Unlike these conventional systems, the emotion classification engine described herein, e.g., DIVA engine 4 of FIG. 1, includes an indexer, e.g., DIVA indexer 10 of FIG. 1, configured to identify the existence and intensity of four emotions specifically useful for financial institutions when handling customer communications. In addition, the machine learning models included within the indexer, e.g., models 12, 14, 16, and 18 of FIG. 1, are trained using communication data received by financial institutions, rather than general communication data from different environments. In this way, the training of the machine learning models within DIVA indexer 10 may be more specific to financial institutions and more accurate in identifying emotive content in communications with a financial institution.

The four emotion factor values output by the machine learning models within DIVA indexer 10 may correspond to a customer's perceived determination, inquisitiveness, valence, and aggression within an inquiry, complaint, or other customer communication. The determination factor value may correspond to a level of purposefulness of the speech of the customer. In some examples, a customer communication that is highly focused on a specific topic may have a high determination factor value. In some examples, a customer communication that repeats itself may have a high determination factor value. In some examples, a customer communication that makes only a short, single statement or a broad, indefinite statement may have a low determination factor value.

The inquisitiveness value may be a measure of the level of curiosity of the speech of the customer communication. In some examples, a customer service inquiry that is probing for information about various aspects of the customer's account or the organization may have a high inquisitiveness value. In some examples, the customer communication that does not indicate an interest in learning anything may have a low inquisitiveness value. The customer who submits a communication with a low inquisitiveness value may wish to resolve any issues without receiving further information.

The valence value may be a measure of the attitude conveyed by the speech of the customer. In some examples, a customer communication that is very negative may have a low valence value. In some examples, a customer communication that is cheerful may have a high valence value. The aggression value may be a measure of the aggressiveness of the speech of the customer communication. In some examples, a customer communication that is brusque may have a high aggression value. In some examples, a customer communication that uses an authoritative tone of voice may have a high aggression value. In some examples, a customer communication that sounds meek or pathetic may have a low aggression value.

An emotion classifier, e.g., emotion classifier 20 of FIG. 1, within the emotion classification engine described herein is configured to classify an emotional state of the customer communication based at least in part on the four emotion factor values output from the machine learning models within DIVA indexer 10 for the customer communication. In some examples, emotion classifier 20 may comprise a machine learning-based or rule-based algorithmic model configured to map the emotion factor values for the customer communication to an emotional state, emotion score, or other emotional indicator. In one example, emotion classifier 20 may have access to a library of emotional states algorithmically tied to different combinations of emotion factor value inputs. The emotional state library may contain emotion states such as "curious," "trusting," "disgruntled," "interesting" etc. As described in this disclosure, the emotion classifier included within the emotion classification engine described herein may be use case specific. In accordance with the techniques described in this disclosure, the emotion classifier may comprise an emotion variance model configured to determine whether a customer communication is indicative of fraud based on a set of emotion factor values.

DIVA indexer 10 and emotion classifier 20 may include functions (e.g., machine learning algorithms and/or rule-based algorithms) configured to be executed by processors. In some examples, the machine learning models within DIVA indexer 10 implement supervised learning, e.g., classify sets of data into groups. For example, a set of data, such as a sequence of code pairs representing customer communication data, may be classified into four values (determination, inquisitiveness, valence, and aggression). The function may include nodes, layers, and connections, and the function may be represented by equations having a plurality of variables and a plurality of known coefficients.

Machine learning algorithms, such as those of DIVA engine 4, may be trained using a training process to create data-specific models. After the training process, the created models may be capable of determining an output data set based on an input data set (e.g., match a sequence of text data strings representing a customer communication to one or more known emotion factor values or emotion states). The training process may implement one or more sets of training data to create the models.

A computing system may be configured to train the deep learning models of the DIVA indexer (determination model 12, inquisitiveness model 14, valence model 16, and aggression model 18) based on a set of training data that includes a plurality of customer communications in one or more memories or storage systems within the organization network, in which each customer communication of the plurality of customer communications is pre-categorized as associated with at least one emotion factor value. The deep learning models may include an artificial neural network, such as an RNN. During training of the model, an RNN may identify a plurality of patterns in a plurality of sequences of events. For example, the RNN may observe word phrases of customer service inquiries known to be indicative of an aggressive emotion. After the model is trained, the model may accept a customer communication as an input and output an emotion factor value (e.g., an integer between −2 and 2, inclusive) as an output, a process known as sequence classification.

A computing system may be configured to train a deep learning model like emotion classifier 20 based on a set of training data that includes a plurality of emotion factor value sets in one or more memories or storage systems within the organization network, in which each set of emotion factor values of the plurality of sets of emotion factor values is pre-categorized as associated with at least a certain emotion state. The deep learning model may include an artificial neural network, such as an RNN. During training of the model, an RNN may identify a plurality of patterns in a plurality of sequences of events. For example, the RNN may observe emotion factor value combinations known to be indicative of a depressed emotion. After the model is trained, the model may accept a set of emotion factor values as an input and output an emotion classification (e.g., angry, interested, joyful, trusting, depressed, etc.) as an output, a process known as sequence classification.

The DIVA engine 4 may be implemented on any suitable computing system, such as one or more server computers, workstations, mainframes, appliances, cloud computing systems, and/or other computing systems that may be capable of performing operations and/or functions described in accordance with one or more aspects of the present disclosure. In some examples, the DIVA engine 4 may be implemented on a computing system that represents a cloud computing system, server farm, and/or server cluster (or portion thereof) that provides services to customer devices and other devices or systems, e.g., agent workstations within a financial institution. In other examples, the DIVA engine 4 may represent or be implemented through one or more virtualized compute instances (e.g., virtual machines, containers) of a data center, cloud computing system, server farm, and/or server cluster.

Figure 2:
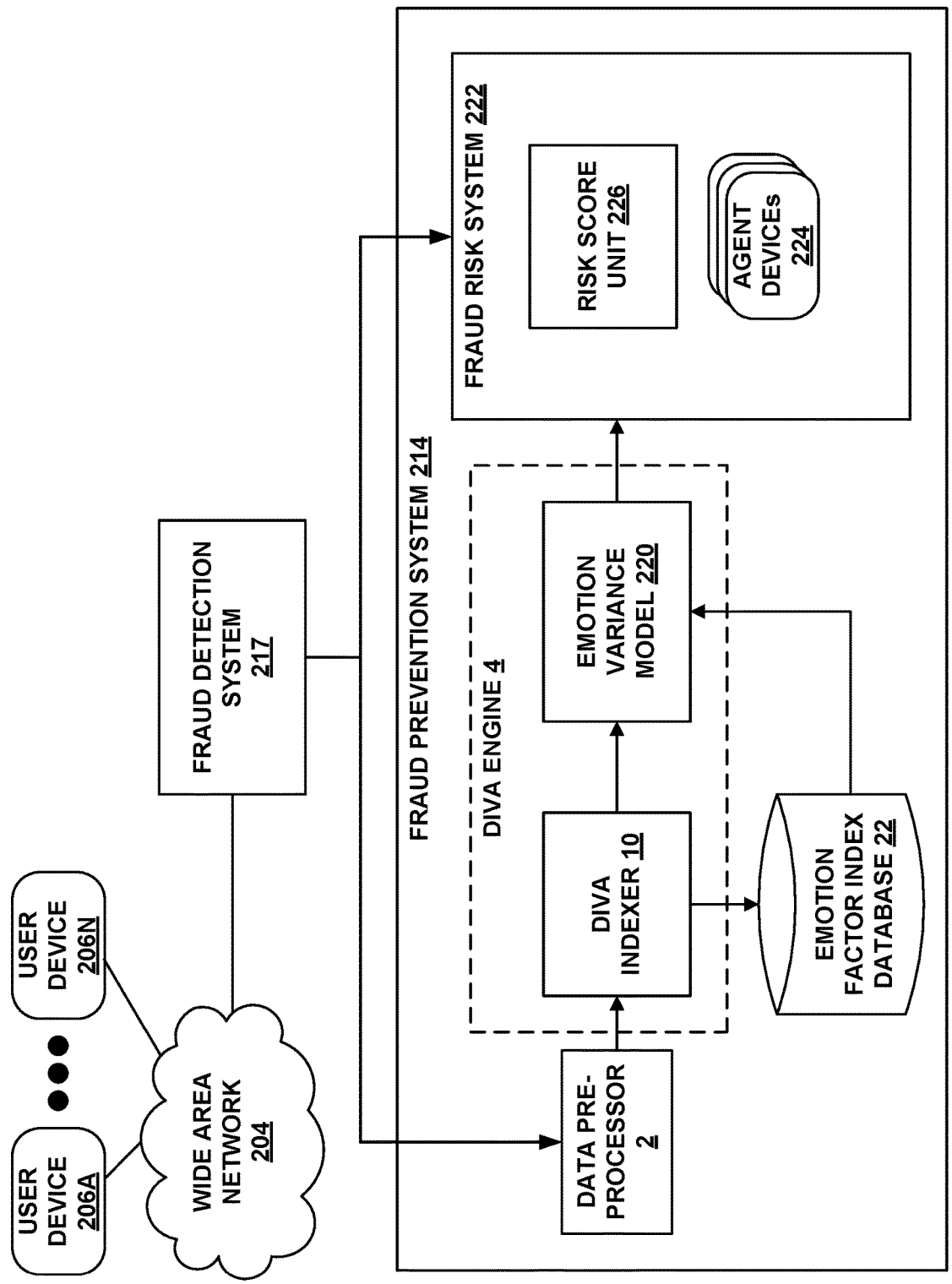
FIG. 2 is a block diagram illustrating an example fraud prevention system, in accordance with the techniques of this disclosure.

FIG. 2 is a block diagram illustrating an example fraud prevention system 214, in accordance with the techniques of this disclosure. The fraud detection system includes DIVA engine 4 as described in FIG. 1 in which the emotion classifier is a use case specific emotion variance model 220 configured to classify a customer communication into an emotional fraud category indicative of the likelihood that the customer communication is fraudulent based on emotion factor values output by the machine learning models of DIVA indexer 10.

As illustrated in FIG. 2, the fraud prevention system 214 includes one or more user devices 206A-206N (collectively "user devices 206") in communication with fraud prevention system 214 via a network 204. Fraud prevention system 214 may run partially on devices in a facility configured to handle incoming communications from user devices 206 operated by users that may be customers or potential customers of a business or organization. Fraud prevention system 214 may include several disparate computing systems configured to handle customer communications, focused on customer accounts with the business or other services provided by the business, e.g., servicing existing accounts, opening new accounts, servicing existing loans, and opening new loans. In some examples described in this disclosure, fraud prevention system 214 may comprise a customer service center of a bank or other financial institution. A contact center of fraud prevention system 214 may allow customers to speak to a live person when resolving service issues and/or leave a voice message detailing one or more service issues. Additionally, or alternatively, customers may submit messages (e.g., service inquiries, etc.) via text channels such as email, text messaging, and social media messaging.

Fraud prevention system 214 may include both "front-end systems" with which the customers or potential customers of the business or organization directly interact, and "back-end systems" in which information about fraud prevention system 214, the business, or existing customers of the business is maintained. Fraud prevention system 214 interacts with fraud detection system 217 as a "back-end system," which may be administered by a third-party network or included in fraud prevention system 214 itself.

User devices 206 may be any suitable communication or computing device, such as a conventional or landline phone, or a mobile, non-mobile, wearable, and/or non-wearable computing device capable of communicating over network 204. For example, each user device of user devices 206 may include any one or combination of a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, and non-mobile computing device that may perform operations in accordance with one or more aspects of the present disclosure. One or more of user devices 206 may support communication services over packet-switched networks, e.g., the public Internet, including Voice over Internet Protocol (VOIP). One or more of user devices 206 may also support communication services over circuit-switched networks, e.g., the public switched telephone network (PSTN).

Fraud prevention system 214 may comprise one or more physical entities (e.g., computing devices, computer servers, quantum computers, desktop computers, tablet computers, laptop computers, smartphones, etc.) and/or virtual entities (e.g., virtual machines, application software in computing machines, a cloud computing system, etc.). In certain examples, fraud prevention system 214 may include one or more computers that process information and/or devices with embedded computers.

Network 204 and fraud prevention system 214 may comprise computer networks (e.g., a wide area network (WAN), such as the Internet, a local area network (LAN), or a virtual private network (VPN)), a telephone network (e.g., the PSTN or a wireless network), or another wired or wireless communication network. Although illustrated as single entities, each of network 204 and fraud prevention system 214 may include a combination of multiple networks. In some examples, network 204 may comprise a public network or a private access network through which user devices 206 may access fraud prevention system 214. In some examples, fraud prevention system 214 may comprise a private network of a business or organization, e.g., a bank or other financial institutions.

Fraud prevention system 214 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, fraud prevention system 214 represents cloud computing systems, server farms, and/or server clusters (or portions thereof) that provide services to customer devices and other devices or systems. In other examples, fraud prevention system 214 may represent or be implemented through one or more virtualized compute instances (e.g., virtual machines, containers) of a data center, cloud computing system, server farm, and/or server cluster. Fraud prevention system 214 may communicate with external systems via one or more networks (e.g., network 204). In some examples, fraud prevention system 214 may use network interfaces (such as Ethernet interfaces, optical transceivers, radio frequency (RF) transceivers, Wi-Fi or Bluetooth radios, or the like), telephony interfaces, or any other type of device that can send and receive information to wirelessly communicate with external systems, e.g., network 204, user device 206, agent devices 224, etc.

Fraud prevention system 214 may include a centralized or distributed network of disparate computing systems made up of interconnected desktop computers, laptops, workstations, wireless devices, network-ready appliances, file servers, print servers, or other computing devices. For example, fraud prevention system 214 may include one or more data centers including a plurality of servers configured to provide account services interconnected with a plurality of databases and other storage facilities in which customer credentials, customer profiles, and customer accounts are stored.

Fraud prevention system 214 may include systems with which a user may interact, including one or more agent devices 224 used by a number of human agents that are representatives of the business or organization. Fraud prevention system 214 also includes a fraud risk system 222 with a risk score unit 226. Risk score unit 226 may receive a risk assessment for a current communication from fraud detection system 217 and an emotional fraud category for the current communication from DIVA engine 4 to determine a risk score for the current communication that is indicative of a probability that the current communication is fraudulent. In some examples, risk score unit 226 may retrieve the risk assessment in the form of a preliminary risk score from fraud detection system 217. Risk score unit 226 may calculate a risk score for the current communication based on the preliminary risk score received from fraud detection system 217 and the emotional fraud category received from DIVA engine 4.

One of user devices 206, e.g., user device 206A, may initiate a communication with fraud prevention system 214 of a financial institution in response to input from a user of user device 206A. User device 206A outputs a signal over wide area network 204. Fraud detection system 217 may operate as a gateway to fraud prevention system 214 by providing an initial determination of whether an inbound communication is fraudulent. For example, fraud detection system 217 may compare markers, e.g., phoneprints or voiceprints, for the inbound communication to known fraudsters, and provide risk information to fraud prevention system 214. In some examples, fraud detection system 217 may be implemented using fraud detection solutions for call centers available through Pindrop®. Fraud detection system 217 may provide a risk assessment (e.g., a preliminary risk score) or other indication of potentially fraudulent intent for each inbound communication to fraud prevention system 214. After processing by fraud detection system 217, the communication and the risk information may be sent to at least fraud risk system 222 of risk prevention system 214 and, in some cases, to data pre-processor 2.

In the illustrated example of FIG. 2, fraud prevention system 214 also includes data pre-preprocessor 2, a DIVA engine 4 that includes one or more machine learning models within DIVA indexer 10, as described with respect to FIG. 1, and emotion variance model 220. Data pre-processor 2 may prepare communications data received from user device 206 for application to the one or more machine learning models within DIVA engine 4. Fraud prevention system 214 may also include components necessary for collecting, storing, and maintaining data used by fraud prevention system 214. The architecture of fraud prevention system 214 illustrated in FIG. 2 is shown for exemplary purposes only and should not be limited to this architecture. In other examples, fraud prevention system 214 may include more, fewer, or different computing systems configured to handle messages representing customer service inquiries.

In some examples, fraud prevention system 214 receives an inbound communication from a user device, e.g., user device 206A, via network 204 and determines whether to route the inbound communication to data pre-processor 2. In accordance with one or more techniques of this disclosure, the communication may comprise communication data in the form of text or audio, such as emails, scanned letters, online chat, telephone calls, etc. A speech recognition model may be used to convert audio communications to plain text data via natural language processing. A text image recognition model may be used to convert hand- or typewritten communications inquiries to plain text data or text-based annotation data.

Text-based annotation data may be a combination of two sets of plain text data. The first set of plain text data may comprise the words and/or text of a customer's message to an organization, while the second set of plain text data may comprise annotations by an agent of the organization. In some examples, the customer may send communication data to an organization in the form of a visual data (e.g., letter, fax, video call, etc.), or audio data (e.g., phone call, web call, video call, etc.). The visual or audio data may have indications of emotive content not captured by the words of the message alone. In that case, an agent of the organization may add annotations, in the form of plain-text data, to the communication data for the customer's message. For example, annotations may describe the customer's behavior during a phone call, including shouting, pleading, and other descriptions of displayed emotion not conveyed through the words of the conversation alone. In some examples, annotations may describe a letter as smudged with tears, or showing circle marks around certain words, and other descriptions of displayed emotion not conveyed through the words in the letter alone.

Data pre-processor 2 may prepare communication data from a current customer communication for submission to the machine learning models of DIVA engine 4. The machine learning models of DIVA indexer 10 may receive pre-processed communication data as input, and output four current emotion factor values indicative of the emotive content of the current communication data. The current emotion factor values may be stored in an emotion factor index database 22 and associated with the current communication data as well as the customer associated with the current communication data. An emotion variance model 220 may use the current emotion factor values as input, as well as historic emotion factor values from the emotion factor index database 22 associated with historic communications. Based on the emotion factor values, emotion variance model 220 may classify the communication into an emotional fraud category (e.g., "potentially fraudulent," "non-fraudulent," "highly likely fraudulent") indicative of whether the emotive content of the communication indicates the communication may be fraudulent.

In some examples, emotion variance model 220 may determine a pattern set of emotion factor values that corresponds to fraudulent communications from historic sets of emotion factor values for historic communications stored in emotion factor index database 22. Emotion variance model 220 may determine that certain combinations of determination, inquisitiveness, valence, and aggression scores are indicative of fraud. For example, emotion variance model 220 may compare a plurality of emotion factor value sets corresponding to known fraudulent communications to one another, and upon determining that a number of sets of emotion factor values of the plurality of emotion factor value sets have values within a small percentage of one another, calculate an average emotion factor value set from the number of sets of emotion factor values.

For example, emotion variance model 220 may determine that one hundred sets of emotion factor values known to correspond to fraudulent communications contain emotion factor values in the following ranges: a determination value between 0.21 and 0.25; an inquisitiveness value between 0.51 and 0.55; a valence value between 0.45 and 0.49; and an aggression value between 0.37 and 0.43. In this example, emotion variance model 220 may determine a pattern set of emotion factor values as 0.23, 0.53, 0.47, and 0.40. Upon receiving an emotion factor value set for a current communication, emotion variance model 220 may compare the current emotion factor value set to the pattern set of emotion factor values and determine if they are similar. For example, each value of the current emotion factor value set may be within ten percent of its corresponding value in the pattern set of emotion factor values. Based on the similarity between the current emotion factor value set and the pattern set of emotion factor values known to correspond to fraudulent communications, emotion variance model 220 may determine that the current communication is also fraudulent, and classify the current communication into an emotional fraud category.

Emotion variance model 220 may classify the current communication into a fraud category more likely to be fraudulent the more closely the current emotion factor value set matches to the pattern set of emotion factor values. For example, emotion variance model 220 may classify a first communication with first emotion factor values that differ from the corresponding emotion factor values in the pattern set of emotion factor values by no more than two percent into an emotional fraud category indicating a more likely chance of fraud than a second communication with second emotion factor values that differ from the corresponding emotion factor values in the pattern set of emotion factor values by no more than five percent.

In some examples, emotion variance model 220 may compute an average set of emotion factor values from historic sets of emotion factor values for historic communications associated with a customer over time. Emotion variance model 220 may retrieve historic sets of emotion factor values from emotion factor index database 22. Emotion variance model 220 may compute the average set of emotion factor values from the historic sets of emotion factor values, where each value of the average set of emotion factor values is averaged from corresponding values in the historic emotion factor value sets. For example, the average determination value in the average set of emotion factor values may be calculated as an average of all the determination values in the historic sets of emotion factor values.

In some examples, emotion variance model 220 may classify a current communication into an emotional fraud category based on a current set of emotion factor values for the current communication and an average set of emotion factor values for the customer over time. For example, emotion variance model 220 may categorize a first communication into a fraud category indicating a higher likelihood of fraud than a second communication, where the first communication has a first set of emotion factor values that differ more from the average set of emotion factor values than a second set of emotion factor values for the second communication.

In some examples, emotion variance model 220 may compute a delta set of emotion factor values for a current communication. Emotion variance model 220 may compute the delta set of emotion factor values for the current communication by calculating a difference between the current emotion factor value set and the average set of emotion factor values. Each value of the delta set of emotion factor values is calculated by determining a difference between the corresponding values in the current emotion factor value set and the average set of emotion factor values. For example, a delta determination value in the delta set of emotion factor values may be calculated as the difference between the determination value from the current emotion factor value set and the average determination value from the average set of emotion factor values. In some examples, emotion variance model 220 may calculate one or more particular average emotion factor values and a delta value for one or more particular emotion factors, i.e., a determination value, or a determination value and an aggression value. Emotion variance model 220 may save power and compute time by only calculating a delta value for only one particular emotion factor value. In some examples, the delta values are calculated as absolute values. In some examples, the delta values may be positive or negative, indicating whether a current emotion factor value was above or below a corresponding average emotion factor value.

In some examples, emotion variance model 220 may classify a current communication into an emotional fraud category based on one or more emotion factor delta values of a delta set of emotion factor values exceeding a threshold. In some examples, the threshold may be a positive threshold that is equal for all delta values. For example, if each of the delta values in a delta set of emotion factor values exceeded 0.5, emotion variance model 220 may classify the current communication into a fraud category indicative of fraud. In some examples, a threshold may be a positive threshold for one or more delta values. For example, if only a determination delta value exceeded 0.8, emotion variance model 220 may classify the current communication into a fraud category indicative of fraud. In some examples, a threshold may be a negative threshold for one or more of the delta values. For example, if both an aggression delta and a valence delta are lower than −0.6, emotion variance model 220 may classify the current communication into a fraud category indicative of fraud. In some examples, there may be a combination of different positive and/or negative thresholds for different delta values. In some examples, multiple delta values may need to cross their respective thresholds for emotion variance model 220 to determine that the communication is indicative of fraud. Emotion variance model 220 may categorize a first communication into a fraud category indicating a higher likelihood of fraud than a second communication, where the first communication has a first delta set of emotion factor values that are larger than a second delta set of emotion factor values for the second communication.

In some examples emotion variance model 220 may be a machine learning model. In some examples, emotion variance model 220 may accept a set of current emotion factor values from a current communication as input, and classify the current communication into an emotional fraud category based on the set of current emotion factor values. In some examples, emotion variance model 220 may accept a delta set of emotion factor values from a current communication as input and classify the current communication into an emotional fraud category based on the delta set of emotion factor values.

Emotion variance model 220 may output the emotional fraud category to fraud risk system 222 to determine a risk score for the current communication indicative of a probability that the current communication is fraudulent.

In some examples, fraud risk system 222 receives a risk assessment from fraud detection system 217 indicating a risk that the current communication is fraudulent based on fraud markers. In examples where fraud detection system 217 comprises an external, third-party-administered system, fraud detection system 217 may compare markers, e.g., phoneprints or voiceprints, for the inbound communication to known fraudsters, and provide the risk assessment to fraud prevention system 214. In other examples where fraud detection system 217 comprises an internal, organization-administered system, fraud detection system 217 may compare markers (e.g., time of communication, type of transaction or service requested, amount of transaction, device sending the communication, location of the device) for the inbound communication to other communications made by the same customer to determine if there is a significant deviation from the customer's normal behavior. For example, if a vast majority of communications from a particular customer are received between nine A.M and eight P.M. central time from a particular device located in Duluth, Minnesota, but the current communication—allegedly from the particular customer—is received at two A.M central time from a different device located in Ankara, Turkey, fraud detection system 217 may send a risk assessment to fraud risk system 222 indicating a high likelihood of fraud.

Risk score unit 226 of fraud risk system 222 may determine a risk score for a current communication based on one or more of the risk assessment and the emotional fraud category. The risk score may consist of a percentage likelihood that the current communication is fraudulent. Fraud risk system 222 may transmit the risk score to one or more agent devices 224 for use in determining how to handle the current communication in real-time. For example, fraud risk system 222 may send a risk score to agent device 224 indicating an eighty-six percent chance that the current communication is fraudulent. In some examples, fraud risk system 222 may flag the current communication as potentially fraudulent within an organization network that communicates with an agent device 224. An agent operating agent device 224 may decide to freeze the accounts of the customer associated with the current communication so that fraudulent actions may not be performed on the accounts. In some examples, fraud risk system 222 may determine that the risk score is high enough to automatically freeze the accounts of the customer associated with the current communication.

By taking into account the emotive content of customer communications and a customer's typical emotive response, fraud risk system 222 may more accurately identify fraudulent communications and more effectively protect customers' assets held in accounts of the business or organization.

Figure 3:
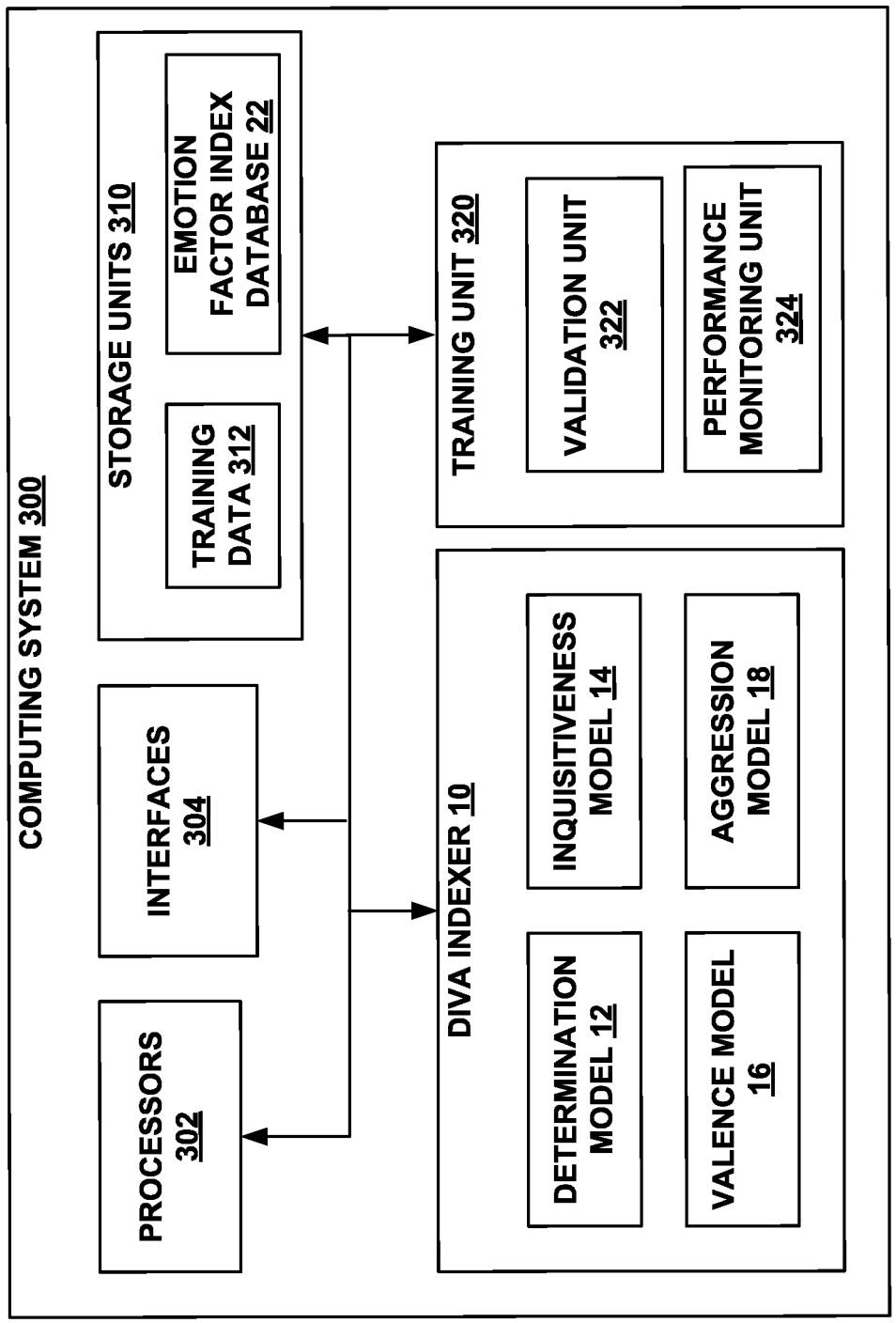
FIG. 3 is a block diagram illustrating an example computing system for running a DIVA indexer, in accordance with the techniques of this disclosure.

FIG. 3 is a block diagram illustrating an example computing system 300 for running a DIVA indexer, in accordance with the techniques of this disclosure. The architecture of computing system 300 illustrated in FIG. 3 is shown for exemplary purposes only. Computing system 300 should not be limited to the illustrated example architecture. In other examples, computing system 300 may be configured in a variety of ways.

As shown in the example of FIG. 3, a computing system 300 includes one or more processors 302, one or more interfaces 304, and one or more storage units 310. The one or more storage units 310 may store training data 312, and an emotion factor index database 22. The computing system 300 also includes the DIVA indexer 10, and a training unit 320, which may be implemented as program instructions and/or data stored in the storage units 310 and executable by the processors 302. The DIVA indexer 10 may comprise a determination model 12, an inquisitiveness model 14, a valence model 16, and an aggression model 18.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300 represents a cloud computing system, server farm, and/or server cluster (or portion thereof) that provides services to customer devices and other devices or systems. In other examples, computing system 300 may represent or be implemented through one or more virtualized compute instances (e.g., virtual machines, containers) of a data center, cloud computing system, server farm, and/or server cluster.

The storage units 310 of computing system 300 may also store an operating system (not shown) executable by the processors 302 to control the operation of components of the computing system 300. The components, units, or modules of the computing system 300 are coupled (physically, communicatively, and/or operatively) using communication channels for inter-component communications. In some examples, the communication channels may include a system bus, a network connection, an inter-process communication data structure, or any other method for communicating data.

The processors 302, in one example, may comprise one or more processors that are configured to implement functionality and/or process instructions for execution within the computing system 300. For example, processors 302 may be capable of processing instructions stored by storage units 310. Processors 302 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

The computing system 300 may utilize interfaces 304 to communicate with external systems via one or more networks, e.g., a customer service center. Interfaces 304 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, the computing system 300 utilizes interfaces 304 to wirelessly communicate with external systems, e.g., other computing devices or systems within fraud prevention system 214 of FIG. 2.

Storage units 310 may be configured to store information within the computing system 300 during operation. Storage units 310 may include a computer-readable storage medium or computer-readable storage device. In some examples, storage units 310 include one or more of a short-term memory or a long-term memory. Storage units 310 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, storage units 310 are used to store program instructions for execution by processors 302. Storage units 310 may be used by software or applications running on the computing system 300 to temporarily store information during program execution.

Computing system 300 includes one or more machine learning models of DIVA indexer 10 and a training unit 320 used to train each of the machine learning models of DIVA indexer 10 using training data 312. As seen in FIG. 3, DIVA indexer 10 includes determination model 12, inquisitiveness model 14, valence model 16, and aggression model 18. The training unit 320 includes validation unit 322 and performance monitoring unit 324.

Machine learning algorithms or functions (e.g., a word embedding algorithm) are trained to create the machine learning models within DIVA indexer 10, configured to accept an input sequence of plain text data or text-based annotation data associated with a message and output, using determination model 12, inquisitiveness model 14, valence model 16, and aggression model 18, four emotion factor values including a determination value, an inquisitiveness value, a valence value, and an aggression value, where each value is an integer between −2 and 2 inclusive (although the integer range could consist of any range useful for the application) representing the intensity of the respective emotion contained within the message. For example, for each emotion factor value, −2 and −1 may be considered low values, while 1 and 2 may be considered high values. For example, a message could be scored with a determination value of negative one, a valence value of zero, an inquisitiveness value of two, and aggression value of two. The machine learning models within DIVA indexer 10 may generate emotion factor values based on text characteristics. For example, aggression model 18 may generate an aggression value of two for an incoming message if a set of text data associated with the incoming message has greater than a threshold level of similarity to known characteristics of messages with aggression values of two, as identified by aggression model 18.

Determination model 12 may be trained to determine a determination value based on input communication data representing a message. A machine learning model may be trained using a training process to create a data-specific model, such as determination model 12, based on training data 312. After the training process, the created model may be capable of determining an output data set based on an input data set (e.g., generate a determination value representing a level of determination emotion in a message based on communication data). The training process may implement a set of training data (e.g., training data 312) to create the model.

Determination model 12 may include functions configured to be executed by processors 302. In some examples, determination model 12 implements supervised learning, e.g., classifies sets of data into groups. For example, a set of data, such as communication data indicative of a message to a financial institution, may be classified with a determination value of negative two, negative one, zero, one, or two. In some examples, the function may include nodes, layers, and connections, and the function may be represented by equations having a plurality of variables and a plurality of known coefficients.

For example, determination model 12 may receive communication data in the form of plain-text or text-based annotation data and may parse the communication data to identify a sequence of items including any one or combination of words, phrases, characters (e.g., punctuation), and numerical values corresponding to a determination emotion and an intensity of the determination emotion. Determination model 12 may output a determination value comprised of an integer between −2 and 2 inclusive, where a higher number represents a higher determination emotion in the message. For example, a determination value of negative two may represent a lowest determination emotion within the message, a determination value of two may represent a highest determination emotion in the message, and a determination value of zero may represent a neutral determination emotion in the message. DIVA indexer 10 may store the determination value in an emotion factor index database 22 and assign an ID to the determination value to associate it with the message and the other emotion factor values generated for the message.

Training data 312 may include data indicative of a plurality of messages. At least some of the plurality of messages may represent customer complaints, responses, transcripts of calls or letters submitted to fraud prevention system 214. The plurality of messages may include a group of messages with a determination value of negative 2, a group of messages with a determination value of negative one, a group of messages with a determination value of zero, a group of messages with a determination value of one, and a group of messages with a determination value of two, where each message of the plurality of messages is known to have a determination value of negative two, negative one, zero, one, or two. In one example, training data 312 contains data representing about equal numbers of messages with determination values of each number negative two through two. In another example, training data 312 contains data including a greater number of messages with a determination value of two than messages with a determination value of zero. In another example, training data 312 contains data including a greater number of messages with a determination value of zero than messages with a determination value of two. Other examples are contemplated wherein training data 312 contains data including a greater number of messages with any particular determination value than a number of messages with any other particular determination value. Training unit 320 may access training data 312 stored in storage units 310, and training unit 320 may train determination model 12 using training data 312.

Validation unit 322 may be configured to determine an accuracy of determination model 12. For example, validation unit 322 may use determination model 12 to determine if an example message corresponding to a known determination value has a determination value of negative two, negative one, zero, one, or two. Validation unit 322 may determine if determination model 12 was able to correctly score the incoming message. Additionally, validation unit 322 may be configured to determine the accuracy of determination model 12 for a plurality of messages example each corresponding to a determination value, and validation unit 322 may be configured to identify an accuracy (e.g., a success rate) in which determination model 12 correctly scores the messages for each determination value. If the accuracy is above a threshold accuracy value, determination model 12 may be used to classify incoming messages to fraud prevention system 214. If the accuracy is below the threshold accuracy value, training unit 320 may re-train determination model 12 based on an updated set of training data. In some examples, the threshold accuracy value in which determination model 12 may be used may be greater than or equal to 90%. In some examples, validation unit 322 may be configured to identify an accuracy in which determination model 12 correctly scores the determination values of a plurality of messages.

Training unit 320 may include performance monitoring unit 324. Performance monitoring unit 324 may monitor a performance of determination model 12 after it is applied to score incoming messages to fraud prevention system 214 (e.g., score the four emotion factor values as integers between −2 and 2 inclusive). In some examples, performance monitoring unit 324 may determine an accuracy of determination model 12 by comparing determination values scored by determination model 12 with known determination values of a plurality of messages. For example, if determination model 12 determines that an incoming message has a determination value of negative two, and the incoming message is discovered to have a determination value of one, performance monitoring unit 324 may record that an incorrect determination value was generated. Performance monitoring unit 324 may continuously monitor an accuracy of determination model 12. Performance monitoring unit 324 may determine a fraction of messages in which determination model 12 correctly scores an incoming message. The fraction may represent a measured accuracy of determination model 12. New messages may be analyzed by performance monitoring unit 324, the new messages representing data that was not used by training unit 320 to create determination model 12. In other words, performance monitoring unit 324 may test the accuracy of determination model 12 continuously using new data. In some examples, if performance monitoring unit 324 determines that the accuracy of determination model 12 is below a threshold accuracy value (e.g., 90%), performance monitoring unit 324 may output an instruction to re-train determination model 12.

Training unit 320 may periodically (e.g., monthly, bi-monthly, yearly, or the like) re-train determination model 12 based on an updated set of training data. The updated set of training data may include part or all of the plurality of messages of training data 312. Additionally, the updated set of training data may include a set of messages that are received by fraud prevention system 214 during a time since determination model 12 was last trained by training unit 320.

Inquisitiveness model 14 may be trained to determine an inquisitiveness value based on input communication data representing a message. A machine learning model may be trained using a training process to create a data-specific model, such as inquisitiveness model 14, based on training data 312. After the training process, the created model may be capable of determining an output data set based on an input data set (e.g., generate an inquisitiveness value representing a level of inquisitive emotion in a message based on communication data). The training process may implement a set of training data (e.g., training data 312) to create the model.

Inquisitiveness model 14 may include functions configured to be executed by processors 302. In some examples, inquisitiveness model 14 implements supervised learning, e.g., classifies sets of data into groups. For example, a set of data, such as communication data indicative of a message to a financial institution, may be classified with an inquisitiveness value of negative two, negative one, zero, one, or two. In some examples, the function may include nodes, layers, and connections, and the function may be represented by equations having a plurality of variables and a plurality of known coefficients.

For example, inquisitiveness model 14 may receive communication data in the form of plain-text or text-based annotation data and may parse the communication data to identify a sequence of items including any one or combination of words, phrases, characters (e.g., punctuation), and numerical values corresponding to an inquisitive emotion and an intensity of the inquisitive emotion. Inquisitiveness model 14 may output an inquisitiveness value comprised of an integer between −2 and 2 inclusive, where a higher number represents a higher inquisitive emotion in the message. For example, an inquisitiveness value of negative two may represent a lowest inquisitive emotion within the message, an inquisitiveness value of two may represent a highest inquisitive emotion in the message, and an inquisitiveness value of zero may represent a neutral inquisitive emotion in the message. DIVA indexer 10 may store the inquisitiveness value in an emotion factor index database 22 and assign an ID to the inquisitiveness value to associate it with the message and the other emotion factor values generated for the message.

Training data 312 may include data indicative of a plurality of messages. At least some of the plurality of messages may represent customer complaints, responses, transcripts of calls or letters submitted to fraud prevention system 214. The plurality of messages may include a group of messages with a inquisitiveness value of negative 2, a group of messages with a inquisitiveness value of negative one, a group of messages with a inquisitiveness value of zero, a group of messages with a inquisitiveness value of one, and a group of messages with a inquisitiveness value of two, where each message of the plurality of messages is known to have an inquisitiveness value of negative two, negative one, zero, one, or two. In one example, training data 312 contains data representing about equal numbers of messages with inquisitiveness values of each number negative two through two. In another example, training data 312 contains data including a greater number of messages with an inquisitiveness value of two than messages with an inquisitiveness value of zero. In another example, training data 312 contains data including a greater number of messages with an inquisitiveness value of zero than messages with an inquisitiveness value of two. Other examples are contemplated wherein training data 312 contains data including a greater number of messages with any particular inquisitiveness value than a number of messages with any other particular inquisitiveness value. Training unit 320 may access training data 312 stored in storage units 310, and training unit 320 may train inquisitiveness model 14 using training data 312.

Validation unit 322 may be configured to determine an accuracy of inquisitiveness model 14. For example, validation unit 322 may use inquisitiveness model 14 to determine if an example message corresponding to a known inquisitiveness value has an inquisitiveness value of negative two, negative one, zero, one, or two. Validation unit 322 may determine if inquisitiveness model 14 was able to correctly score the incoming message. Additionally, validation unit 322 may be configured to determine the accuracy of inquisitiveness model 14 for a plurality of messages example each corresponding to an inquisitiveness value, and validation unit 322 may be configured to identify an accuracy (e.g., a success rate) in which inquisitiveness model 14 correctly scores the messages for each inquisitiveness value. If the accuracy is above a threshold accuracy value, inquisitiveness model 14 may be used to classify incoming messages to fraud prevention system 214. If the accuracy is below the threshold accuracy value, training unit 320 may re-train inquisitiveness model 14 based on an updated set of training data. In some examples, the threshold accuracy value in which inquisitiveness model 14 may be used may be greater than or equal to 90%. In some examples, validation unit 322 may be configured to identify an accuracy in which inquisitiveness model 14 correctly scores the inquisitiveness values of a plurality of messages.

Training unit 320 may include performance monitoring unit 324. Performance monitoring unit 324 may monitor a performance of inquisitiveness model 14 after it is applied to score incoming messages to fraud prevention system 214 (e.g., score the four emotion factor values as integers between −2 and 2 inclusive). In some examples, performance monitoring unit 324 may determine an accuracy of inquisitiveness model 14 by comparing inquisitiveness values scored by inquisitiveness model 14 with known inquisitiveness values of a plurality of messages. For example, if inquisitiveness model 14 determines that an incoming message has an inquisitiveness value of negative two, and the incoming message is discovered to have an inquisitiveness value of one, performance monitoring unit 324 may record that an incorrect inquisitiveness value was generated. Performance monitoring unit 324 may continuously monitor an accuracy of inquisitiveness model 14. Performance monitoring unit 324 may determine a fraction of messages in which inquisitiveness model 14 correctly scores an incoming message. The fraction may represent a measured accuracy of inquisitiveness model 14. New messages may be analyzed by performance monitoring unit 324, the new messages representing data that was not used by training unit 320 to create inquisitiveness model 14. In other words, performance monitoring unit 324 may test the accuracy of inquisitiveness model 14 continuously using new data. In some examples, if performance monitoring unit 324 determines that the accuracy of inquisitiveness model 14 is below a threshold accuracy value (e.g., 90%), performance monitoring unit 324 may output an instruction to re-train inquisitiveness model 14.

Training unit 320 may periodically (e.g., monthly, bi-monthly, yearly, or the like) re-train inquisitiveness model 14 based on an updated set of training data. The updated set of training data may include part or all of the plurality of messages of training data 312. Additionally, the updated set of training data may include a set of messages that are received by fraud prevention system 214 during a time since inquisitiveness model 14 was last trained by training unit 320.

Valence model 16 may be trained to determine a valence value based on input communication data representing a message. A machine learning model may be trained using a training process to create a data-specific model, such as valence model 16, based on training data 312. After the training process, the created model may be capable of determining an output data set based on an input data set (e.g., generate a valence value representing a level of negative or positive emotion in a message based on communication data). The training process may implement a set of training data (e.g., training data 312) to create the model.

Valence model 16 may include functions configured to be executed by processors 302. In some examples, valence model 16 implements supervised learning, e.g., classifies sets of data into groups. For example, a set of data, such as communication data indicative of a message to a financial institution, may be classified with a valence value of negative two, negative one, zero, one, or two. In some examples, the function may include nodes, layers, and connections, and the function may be represented by equations having a plurality of variables and a plurality of known coefficients.

For example, valence model 16 may receive communication data in the form of plain-text or text-based annotation data and may parse the communication data to identify a sequence of items including any one or combination of words, phrases, characters (e.g., punctuation), and numerical values corresponding to a positive or negative emotion and an intensity of the emotion. Valence model 16 may output a valence value comprised of an integer between −2 and 2 inclusive, where a higher number represents a more positive emotion in the message. For example, a valence value of negative two may represent a very negative emotion within the message, a valence value of two may represent a very positive emotion in the message, and a valence value of zero may represent a neutral emotion in the message. DIVA indexer 10 may store the valence value in an emotion factor index database 22 and assign an ID to the valence value to associate it with the message and the other emotion factor values generated for the message.

Training data 312 may include data indicative of a plurality of messages. At least some of the plurality of messages may represent customer complaints, responses, transcripts of calls or letters submitted to fraud prevention system 214. The plurality of messages may include a group of messages with a valence value of negative 2, a group of messages with a valence value of negative one, a group of messages with a valence value of zero, a group of messages with a valence value of one, and a group of messages with a valence value of two, where each message of the plurality of messages is known to have a valence value of negative two, negative one, zero, one, or two. In one example, training data 312 contains data representing about equal numbers of messages with valence values of each number negative two through two. In another example, training data 312 contains data including a greater number of messages with a valence value of two than messages with a valence value of zero. In another example, training data 312 contains data including a greater number of messages with a valence value of zero than messages with a valence value of two. Other examples are contemplated wherein training data 312 contains data including a greater number of messages with any particular valence value than a number of messages with any other particular valence value. Training unit 320 may access training data 312 stored in storage units 310, and training unit 320 may train valence model 16 using training data 312.

Validation unit 322 may be configured to determine an accuracy of valence model 16. For example, validation unit 322 may use valence model 16 to determine if an example message corresponding to a known valence value has a valence value of negative two, negative one, zero, one, or two. Validation unit 322 may determine if valence model 16 was able to correctly score the incoming message. Additionally, validation unit 322 may be configured to determine the accuracy of valence model 16 for a plurality of messages example each corresponding to a valence value, and validation unit 322 may be configured to identify an accuracy (e.g., a success rate) in which valence model 16 correctly scores the messages for each valence value. If the accuracy is above a threshold accuracy value, valence model 16 may be used to classify incoming messages to fraud prevention system 214. If the accuracy is below the threshold accuracy value, training unit 320 may re-train valence model 16 based on an updated set of training data. In some examples, the threshold accuracy value in which valence model 16 may be used may be greater than or equal to 90%. In some examples, validation unit 322 may be configured to identify an accuracy in which valence model 16 correctly scores the valence values of a plurality of messages.

Training unit 320 may include performance monitoring unit 324. Performance monitoring unit 324 may monitor a performance of valence model 16 after it is applied to score incoming messages to fraud prevention system 214 (e.g., score the four emotion factor values as integers between −2 and 2 inclusive). In some examples, performance monitoring unit 324 may determine an accuracy of valence model 16 by comparing valence values scored by valence model 16 with known valence values of a plurality of messages. For example, if valence model 16 determines that an incoming message has a valence value of negative two, and the incoming message is discovered to have a valence value of one, performance monitoring unit 324 may record that an incorrect valence value was generated. Performance monitoring unit 324 may continuously monitor an accuracy of valence model 16. Performance monitoring unit 324 may determine a fraction of messages in which valence model 16 correctly scores an incoming message. The fraction may represent a measured accuracy of valence model 16. New messages may be analyzed by performance monitoring unit 324, the new messages representing data that was not used by training unit 320 to create valence model 16. In other words, performance monitoring unit 324 may test the accuracy of valence model 16 continuously using new data. In some examples, if performance monitoring unit 324 determines that the accuracy of valence model 16 is below a threshold accuracy value (e.g., 90%), performance monitoring unit 324 may output an instruction to re-train valence model 16.

Training unit 320 may periodically (e.g., monthly, bi-monthly, yearly, or the like) re-train valence model 16 based on an updated set of training data. The updated set of training data may include part or all of the plurality of messages of training data 312. Additionally, the updated set of training data may include a set of messages that are received by fraud prevention system 214 during a time since valence model 16 was last trained by training unit 320.

Aggression model 18 may be trained to determine an aggression value based on input communication data representing a message. A machine learning model may be trained using a training process to create a data-specific model, such as aggression model 18, based on training data 312. After the training process, the created model may be capable of determining an output data set based on an input data set (e.g., generate an aggression value representing a level of aggressive emotion in a message based on communication data). The training process may implement a set of training data (e.g., training data 312) to create the model.

Aggression model 18 may include functions configured to be executed by processors 302. In some examples, aggression model 18 implements supervised learning, e.g., classifies sets of data into groups. For example, a set of data, such as communication data indicative of a message to a financial institution, may be classified with an aggression value of negative two, negative one, zero, one, or two. In some examples, the function may include nodes, layers, and connections, and the function may be represented by equations having a plurality of variables and a plurality of known coefficients.

For example, aggression model 18 may receive communication data in the form of plain-text or text-based annotation data and may parse the communication data to identify a sequence of items including any one or combination of words, phrases, characters (e.g., punctuation), and numerical values corresponding to an aggressive emotion and an intensity of the aggressive emotion. Aggression model 18 may output an aggression value comprised of an integer between −2 and 2 inclusive, where a higher number represents a higher aggressive emotion in the message. For example, an aggression value of negative two may represent a lowest aggressive emotion within the message, an aggression value of two may represent a highest aggressive emotion in the message, and an aggression value of zero may represent a neutral aggressive emotion in the message. DIVA indexer 10 may store the aggression value in an emotion factor index database 22 and assign an ID to the aggression value to associate it with the message and the other emotion factor values generated for the message.

Training data 312 may include data indicative of a plurality of messages. At least some of the plurality of messages may represent customer complaints, responses, transcripts of calls or letters submitted to fraud prevention system 214. The plurality of messages may include a group of messages with a aggression value of negative 2, a group of messages with a aggression value of negative one, a group of messages with a aggression value of zero, a group of messages with a aggression value of one, and a group of messages with a aggression value of two, where each message of the plurality of messages is known to have an aggression value of negative two, negative one, zero, one, or two. In one example, training data 312 contains data representing about equal numbers of messages with aggression values of each number negative two through two. In another example, training data 312 contains data including a greater number of messages with an aggression value of two than messages with an aggression value of zero. In another example, training data 312 contains data including a greater number of messages with an aggression value of zero than messages with an aggression value of two. Other examples are contemplated wherein training data 312 contains data including a greater number of messages with any particular aggression value than a number of messages with any other particular aggression value. Training unit 320 may access training data 312 stored in storage units 310, and training unit 320 may train aggression model 18 using training data 312.

Validation unit 322 may be configured to determine an accuracy of aggression model 18. For example, validation unit 322 may use aggression model 18 to determine if an example message corresponding to a known aggression value has an aggression value of negative two, negative one, zero, one, or two. Validation unit 322 may determine if aggression model 18 was able to correctly score the incoming message. Additionally, validation unit 322 may be configured to determine the accuracy of aggression model 18 for a plurality of messages example each corresponding to an aggression value, and validation unit 322 may be configured to identify an accuracy (e.g., a success rate) in which aggression model 18 correctly scores the messages for each aggression value. If the accuracy is above a threshold accuracy value, aggression model 18 may be used to classify incoming messages to fraud prevention system 214. If the accuracy is below the threshold accuracy value, training unit 320 may re-train aggression model 18 based on an updated set of training data. In some examples, the threshold accuracy value in which aggression model 18 may be used may be greater than or equal to 90%. In some examples, validation unit 322 may be configured to identify an accuracy in which aggression model 18 correctly scores the aggression values of a plurality of messages.

Training unit 320 may include performance monitoring unit 324. Performance monitoring unit 324 may monitor a performance of aggression model 18 after it is applied to score incoming messages to fraud prevention system 214 (e.g., score the four emotion factor values as integers between −2 and 2 inclusive). In some examples, performance monitoring unit 324 may determine an accuracy of aggression model 18 by comparing aggression values scored by aggression model 18 with known aggression values of a plurality of messages. For example, if aggression model 18 determines that an incoming message has an aggression value of negative two, and the incoming message is discovered to have an aggression value of one, performance monitoring unit 324 may record that an incorrect aggression value was generated. Performance monitoring unit 324 may continuously monitor an accuracy of aggression model 18. Performance monitoring unit 324 may determine a fraction of messages in which aggression model 18 correctly scores an incoming message. The fraction may represent a measured accuracy of aggression model 18. New messages may be analyzed by performance monitoring unit 324, the new messages representing data that was not used by training unit 320 to create aggression model 18. In other words, performance monitoring unit 324 may test the accuracy of aggression model 18 continuously using new data. In some examples, if performance monitoring unit 324 determines that the accuracy of aggression model 18 is below a threshold accuracy value (e.g., 90%), performance monitoring unit 324 may output an instruction to re-train aggression model 18.

Training unit 320 may periodically (e.g., monthly, bi-monthly, yearly, or the like) re-train aggression model 18 based on an updated set of training data. The updated set of training data may include part or all of the plurality of messages of training data 312. Additionally, the updated set of training data may include a set of messages that are received by fraud prevention system 214 during a time since aggression model 18 was last trained by training unit 320.

Computing system 300 may receive communication data indicative of a customer message and input the plain text data or text-based annotation data to DIVA indexer 10. The machine learning models 12, 14, 16, and 18 of DIVA indexer 10 output the four emotion factor values and store the emotion factor values in emotion factor index database 22. Computing system 300 may then send the emotion factor values, e.g., using interfaces 304, to another computing system executing an emotion variance model 220 configured to determine whether the message is indicative of fraud based on the emotion factor values.

Figure 4:
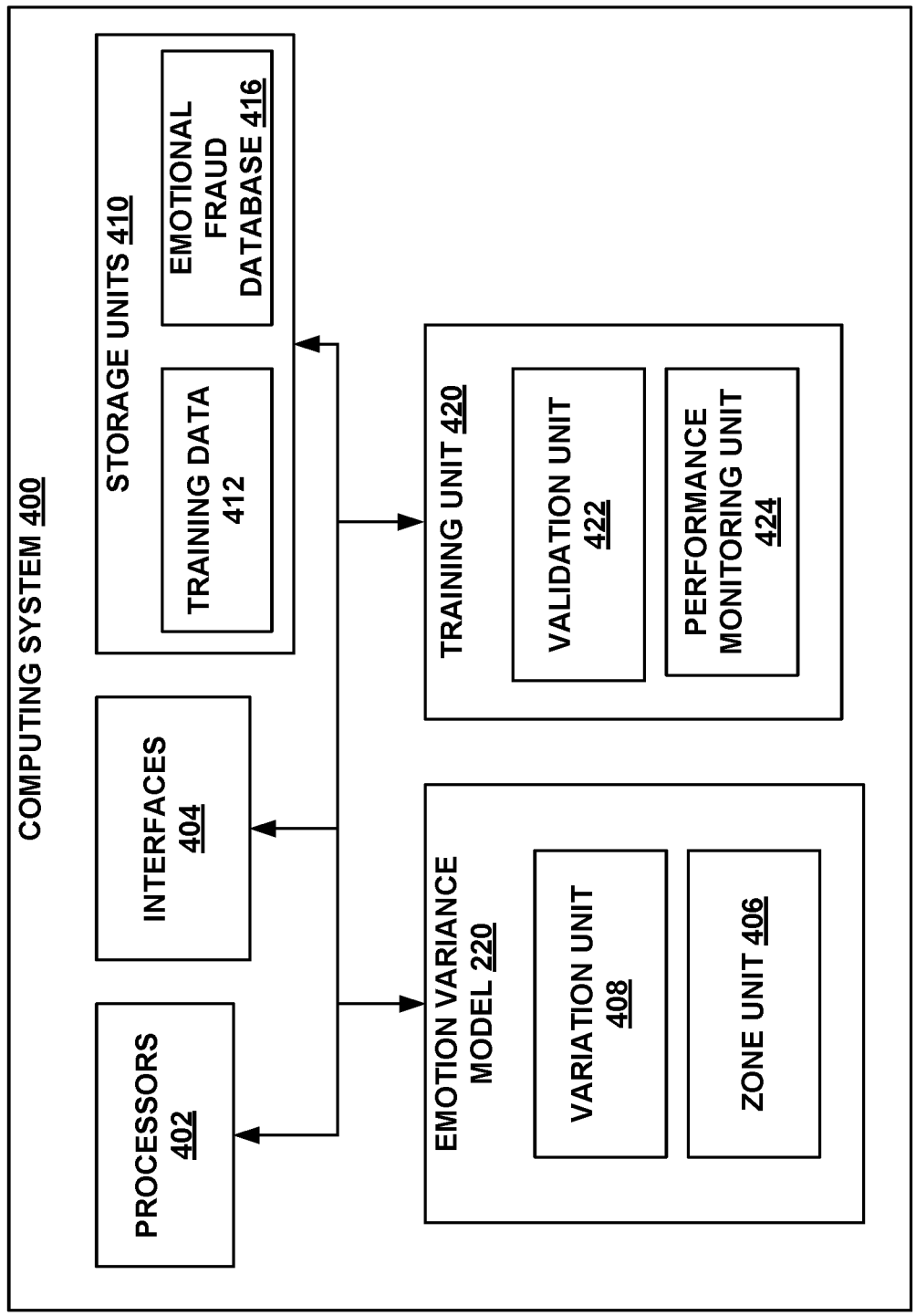
FIG. 4 is a block diagram illustrating an example computing system for running an emotion variance model, in accordance with the techniques of this disclosure.

FIG. 4 is a block diagram illustrating an example computing system 400 for running an emotion variance model 220, in accordance with the techniques of this disclosure. The architecture of computing system 400 illustrated in FIG. 4 is shown for exemplary purposes only. Computing system 400 should not be limited to the illustrated example architecture. In other examples, computing system 400 may be configured in a variety of ways. Although computing system 300 and computing system 400 are illustrated herein as separate systems, in other examples DIVA indexer 10 and emotion variance model 220 may be run on a single, shared computing system.

Computing system 400 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 400 represents a cloud computing system, server farm, and/or server cluster (or portion thereof) that provides services to customer devices and other devices or systems. In other examples, computing system 400 may represent or be implemented through one or more virtualized compute instances (e.g., virtual machines, containers) of a data center, cloud computing system, server farm, and/or server cluster.

As shown in the example of FIG. 4, a computing system 400 includes one or more processors 402, one or more interfaces 404, and one or more storage units 410. The one or more storage units 410 may store training data 412, and/or an emotional fraud database 416. The computing system 400 also includes the emotion variance model 220, and a training unit 420, which may be implemented as program instructions and/or data stored in the storage units 410 and executable by the processors 402.

The storage units 410 of the computing system 400 may also store an operating system (not shown) executable by the processors 402 to control the operation of components of the computing system 400. The components, units, or modules of the computing system 400 are coupled (physically, communicatively, and/or operatively) using communication channels for inter-component communications. In some examples, the communication channels may include a system bus, a network connection, an inter-process communication data structure, or any other method for communicating data.

The processors 402, in one example, may comprise one or more processors that are configured to implement functionality and/or process instructions for execution within the computing system 400. For example, processors 402 may be capable of processing instructions stored by storage units 410. Processors 402 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Computing system 400 may utilize interfaces 404 to communicate with external systems via one or more networks, e.g., a customer service center. Interfaces 404 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, the computing system 400 utilizes interfaces 404 to wirelessly communicate with external systems, e.g., other computing devices or systems within fraud prevention system 214 of FIG. 2.

Storage units 410 may be configured to store information within the computing system 400 during operation. Storage units 410 may include a computer-readable storage medium or computer-readable storage device. In some examples, storage units 410 include one or more of a short-term memory or a long-term memory. Storage units 410 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, storage units 410 are used to store program instructions for execution by processors 402. Storage units 410 may be used by software or applications running on the computing system 400 to temporarily store information during program execution.

Computing system 400 includes a machine learning emotion variance model 220 with a variation unit 408 and zone unit 406. Computing system 400 also includes a training unit 420. As seen in FIG. 4, training unit 420 includes validation unit 422 and performance monitoring unit 424.

In some examples, emotion variance model 220 may be configured to classify a current communication into an emotional fraud category based on a set of emotion factor values for the current communication associated with a customer. Computing system 400 may retrieve, e.g., using interfaces 404, the emotion factor values associated with a current communication from emotion factor index database 22. Emotion variance model 220 may receive one or more of the emotion factor values as input and output an emotional fraud category. In some examples, the emotional fraud category may be a number (e.g., zero or one, between zero and ten), where higher numbers reflect a higher probability that the current communication associated with the emotion factor values is fraudulent. In some examples, the emotional fraud category may be a text string (e.g., "potentially fraudulent," "non-fraudulent," "highly likely fraudulent") indicative of whether the current communication may be fraudulent. The emotional fraud category may be stored in an emotional fraud database 416 and associated with the current communication. In this way, emotion variance model 220 may recognize fraudulent patterns in emotion factor value sets for communications.

In some examples, emotion variance model 220 may be configured to classify a current communication into an emotional fraud category based on a delta set of emotion factor values for the current communication associated with a customer. Computing system 400 may retrieve, e.g., using interfaces 404, a current set of emotion factor values associated with a current communication from emotion factor index database 22. In some examples, computing system 400 may receive the current set of emotion factor values from DIVA indexer 10. Computing system 400 may retrieve historic emotion factor values for historic communications associated with a customer over time from emotion factor index database 22. One or more processors of computing system 400 may determine a delta set of emotion factor values as described above with respect to FIG. 2. Emotion variance model 220 may receive one or more values from the delta set of emotion factor values as input and output an emotional fraud category. In some examples, the emotional fraud category may be a number (e.g., zero or one, between zero and ten), where higher numbers reflect a higher probability that the current communication associated with the emotion factor values is fraudulent. In some examples, the emotional fraud category may be a text string (e.g., "potentially fraudulent," "non-fraudulent," "highly likely fraudulent") indicative of whether the current communication may be fraudulent. The emotional fraud category may be stored in an emotional fraud database 416 and associated with the current communication. In this way, emotion variance model 220 may take into account the emotive content of past customer communications for a given customer when classifying a current communication for the given customer into an emotion fraud category.

Emotion variance model 220 may include functions configured to be executed by processors 402. In some examples, emotion variance model 220 implements supervised learning, e.g., classifies sets of data into groups. For example, a set of data, such as a set of one or more emotion factor values indicative of the emotion content in a communication sent to a financial institution, may be classified with an emotional fraud category. In some examples, the function may include nodes, layers, and connections, and the function may be represented by equations having a plurality of variables and a plurality of known coefficients.

Machine learning algorithms, such as some examples of emotion variance model 220, may be trained using a training process to create data-specific models, such as emotion variance model 220 based on training data 412. After the training process, the created model may be capable of determining an output data set based on an input data set (e.g., classify a communication into an emotional fraud category based on a set of one or more emotion factor values). The training process may implement a set of training data (e.g., training data 412) to create the model.

Training data 412 may include data indicative of a plurality of sets of emotion factor values. At least some of the plurality of sets of emotion factor values may represent the emotive content of customer communications submitted to computing system 400.

In one example, the plurality of sets of emotion factor values may include a group of sets of emotion factor values labeled with a first emotional fraud category, a group of sets of emotion factor values labeled with a second emotional fraud category, and so on for each emotional fraud category of a plurality of emotional fraud categories, where each group of sets of emotion factor values of the plurality of sets of emotion factor values is known to have a particular emotional fraud category. In some examples, training data 412 contains data representing about equal numbers of sets of emotion factor values labeled with each emotional fraud category of the plurality of emotional fraud category. In another example, training data 412 contains data including a greater number of sets of emotion factor values labeled with a first emotional fraud category than a number of sets of emotion factor values labeled with a second emotional fraud category. Other examples are contemplated wherein training data 412 contains data including a greater number of sets of emotion factor values labeled with any particular emotional fraud category than a number of sets of emotion factor values labeled with any other particular emotional fraud category.

In another example, the plurality of sets of emotion factor values may include a group of delta sets of emotion factor values labeled with a first emotional fraud category, a group of delta sets of emotion factor values labeled with a second emotional fraud category, and so on for each emotional fraud category of a plurality of emotional fraud category, where each group of delta sets of emotion factor values of the plurality of delta sets of emotion factor values is known to have a particular emotional fraud category label. In some examples, training data 412 contains data representing about equal numbers of delta sets of emotion factor values labeled with each emotional fraud category of the plurality of emotional fraud categories. In another example, training data 412 contains data including a greater number of delta sets of emotion factor values labeled with a first emotional fraud category than a number of delta sets of emotion factor values labeled with a second emotional fraud category. Other examples are contemplated wherein training data 412 contains data including a greater number of delta sets of emotion factor values labeled with any particular emotional fraud category than a number of delta sets of emotion factor values labeled with any other particular emotional fraud category. Training unit 420 may access training data 412 stored in storage units 410, and training unit 420 may train the emotion variance model 220 using training data 412.

In some examples, a machine learning algorithm or function (e.g., a word embedding algorithm) is trained to create the emotion variance model 220 configured to accept an input set of emotion factor values associated with a current customer communication for a particular customer and output, using zone unit 406, an emotional fraud category classification for the customer indicative of a probability that the current communication is fraudulent. For example, emotion variance model 220 may output classifications based on mapped patterns of emotion factor values. For example, emotion variance model 220 may classify a current communication as "likely fraudulent" if the input set of emotion factor values associated with the current communication has a greater than threshold level of similarity to known characteristics of sets of emotion factor values classified as "likely fraudulent", as identified by zone unit 406 with reference to emotional fraud database 416. Training unit 420 may output emotional fraud categories to storage units 410.

In some examples, a machine learning algorithm or function (e.g., a word embedding algorithm) is trained to create the emotion variance model 220 configured to accept an input delta set of emotion factor values associated with a current customer communication, and output, using variation unit 408, an emotional fraud category classification for the customer indicative of a probability that the current communication is fraudulent. For example, emotion variance model 220 may output classifications based on mapped patterns of emotion factor delta values. For example, emotion variance model 220 may classify a current communication as "likely fraudulent" if the input delta set of emotion factor values associated with the current communication has a greater than threshold level of similarity to known characteristics of delta sets of emotion factor values classified as "likely fraudulent", as identified by variation unit 408 with reference to emotional fraud database 416. Training unit 420 may output emotional fraud categories to storage units 410.

Validation unit 422 may be configured to determine an accuracy of emotion variance model 220. In some examples, validation unit 422 may use emotion variance model 220 to determine if example sets of emotion factor values for customer communications correspond to a known emotional fraud category classification. Validation unit 422 may determine if emotion variance model 220 is able to correctly classify the set of emotion factor values. Additionally, validation unit 422 may be configured to determine the accuracy of emotion variance model 220 for a plurality of example emotional fraud category classifications each corresponding to one or more sets of emotion factor values associated with customer communications, and validation unit 422 may be configured to identify an accuracy (e.g., a success rate) in which emotion variance model 220 correctly classifies the one or more sets of emotion factor values for each emotional fraud category. If the accuracy is above a threshold accuracy value, emotion variance model 220 may be used to classify sets of emotion factor values output by DIVA indexer 10. If the accuracy is below the threshold accuracy value, training unit 420 may re-train emotion variance model 220 based on an updated set of training data.

In some examples, the threshold accuracy value in which emotion variance model 220 may be used may be greater than or equal to 90%. In some examples, validation unit 422 may be configured to identify an accuracy in which emotion variance model 220 correctly classifies a plurality of sets of emotion factor values into emotional fraud categories.

In some examples, validation unit 422 may use emotion variance model 220 to determine if example delta sets of emotion factor values for customer communications correspond to a known emotional fraud category classification. Validation unit 422 may determine if emotion variance model 220 is able to correctly classify the delta set of emotion factor values. Additionally, validation unit 422 may be configured to determine the accuracy of emotion variance model 220 for a plurality of example emotional fraud category classifications each corresponding to one or more delta sets of emotion factor values associated with customer communications, and validation unit 422 may be configured to identify an accuracy (e.g., a success rate) in which emotion variance model 220 correctly classifies the one or more delta sets of emotion factor values for each emotional fraud category. If the accuracy is above a threshold accuracy value, emotion variance model 220 may be used to classify delta sets of emotion factor values output by DIVA indexer 10. If the accuracy is below the threshold accuracy value, training unit 420 may re-train emotion variance model 220 based on an updated set of training data. In some examples, the threshold accuracy value in which emotion variance model 220 may be used may be greater than or equal to 90%. In some examples, validation unit 422 may be configured to identify an accuracy in which emotion variance model 220 correctly classifies a plurality of delta sets of emotion factor values into emotional fraud categories.

Training unit 420 may include performance monitoring unit 424. Performance monitoring unit 424 may monitor a performance of emotion variance model 220 after it is applied to classify communications based on sets of emotion factor values or delta sets of emotion factor values.

In some examples, performance monitoring unit 424 may determine an accuracy of emotion variance model 220 by comparing emotional fraud category classifications generated by emotion variance model 220 with known emotional fraud category classifications of a plurality of sets of emotion factor values. For example, if emotion variance model 220 classifies an incoming set of emotion factor values into an emotional fraud category of "fraudulent," and the set of emotion factor values is discovered to have a classification of "not fraudulent," performance monitoring unit 424 may record that a communication was classified into an incorrect emotional fraud category. Performance monitoring unit 424 may continuously monitor an accuracy of emotion variance model 220. Performance monitoring unit 424 may determine a fraction of sets of emotion factor values in which emotion variance model 220 correctly classifies a communication into an emotional fraud category. The fraction may represent a measured accuracy of the model. New sets of emotion factor values may be analyzed by performance monitoring unit 424, the new sets of emotion factor values representing data that was not used by training unit 420 to create the model. In other words, performance monitoring unit 424 may test the accuracy of the model continuously using new data. In some examples, if performance monitoring unit 424 determines that the accuracy of emotion variance model 220 is below a threshold accuracy value (e.g., 90%), performance monitoring unit 424 may output an instruction to re-train emotion variance model 220.

In some examples, performance monitoring unit 424 may determine an accuracy of emotion variance model 220 by comparing emotional fraud category classifications generated by emotion variance model 220 with known emotional fraud category classifications of a plurality of delta sets of emotion factor values. For example, if emotion variance model 220 classifies an incoming delta set of emotion factor values into an emotional fraud category of "fraudulent," and the delta set of emotion factor values is discovered to have a classification of "not fraudulent," performance monitoring unit 424 may record that a communication was classified into an incorrect emotional fraud category. Performance monitoring unit 424 may continuously monitor an accuracy of emotion variance model 220. Performance monitoring unit 424 may determine a fraction of delta sets of emotion factor values in which emotion variance model 220 correctly classifies a communication into an emotional fraud category. The fraction may represent a measured accuracy of the model. New delta sets of emotion factor values may be analyzed by performance monitoring unit 424, the new delta sets of emotion factor values representing data that was not used by training unit 420 to create the model. In other words, performance monitoring unit 424 may test the accuracy of the model continuously using new data. In some examples, if performance monitoring unit 424 determines that the accuracy of emotion variance model 220 is below a threshold accuracy value (e.g., 90%), performance monitoring unit 424 may output an instruction to re-train emotion variance model 220.

Training unit 420 may periodically (e.g., monthly, bi-monthly, yearly, or the like) re-train emotion variance model 220 based on an updated set of training data. The updated set of training data may include part or all of the plurality of sets or delta sets of emotion factor values of training data 412. Additionally, the updated set of training data may include a plurality of sets of emotion factor values for communications that are received by fraud prevention system 214 during a time since emotion variance model 220 was last trained by training unit 420.

Fraud risk system 222 may receive the emotional fraud category for a communication as one of a plurality of inputs to determine a risk score indicative of a probability that the communication is fraudulent. Fraud risk system 222 may automatically put a hold on an account allegedly associated with a communication where a risk score calculated for the communication is above a threshold value. Different types of accounts, or accounts with different assets or amount of assets in them may have different thresholds of risk score for automatic holds. Fraud risk system 222 may transmit the risk score to one or more agent devices 224 for use in determining how to handle the communication and any allegedly associated accounts. For example, fraud risk system 222 may send a risk score to agent device 224 indicating an eighty-six percent chance that the current communication is fraudulent. An agent operating agent device 224 may decide to put a hold on the accounts of the customer associated with the current communication.

Figure 5:
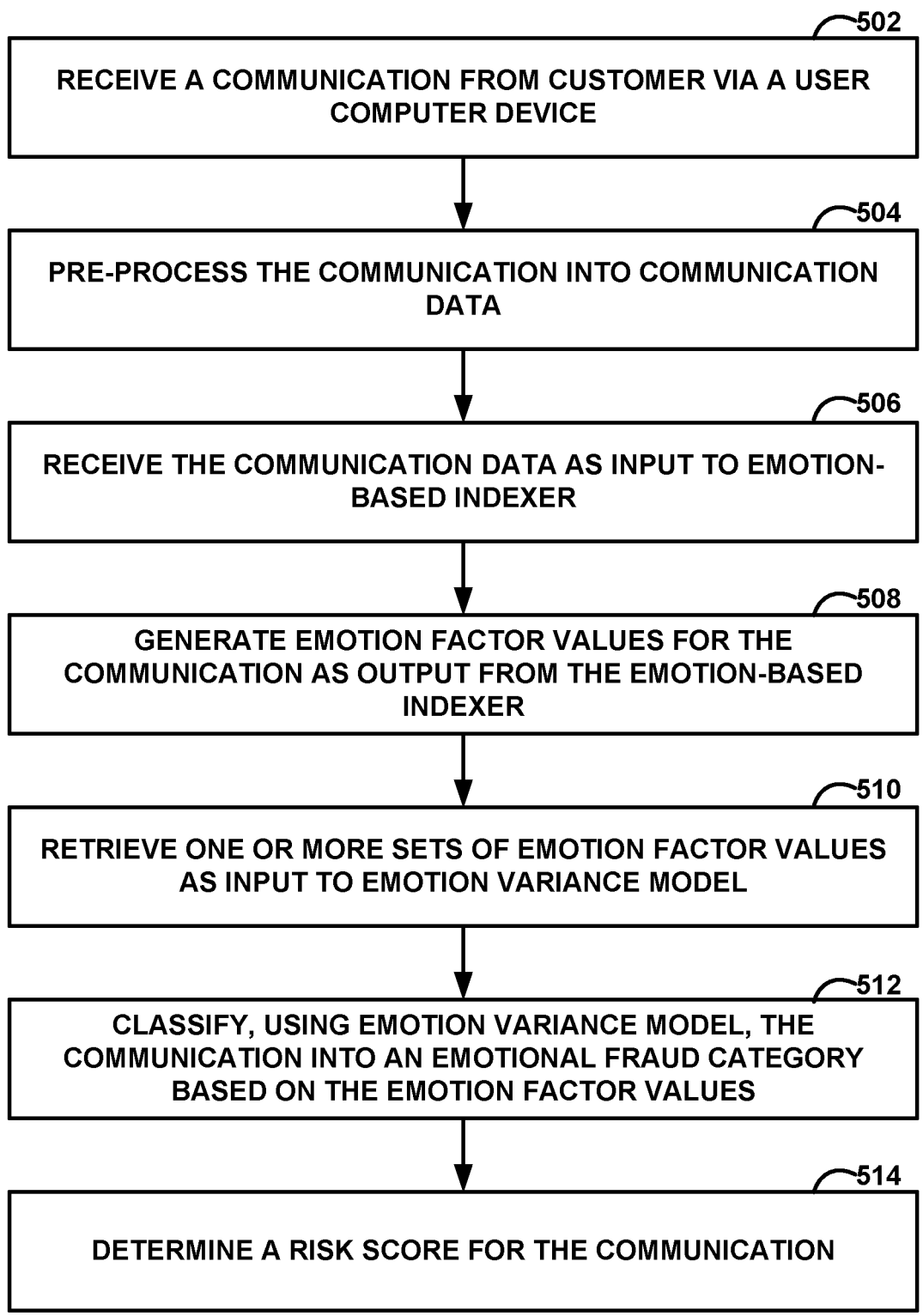
FIG. 5 is a flow diagram illustrating an example process for determining whether a communication is indicative of fraud, in accordance with the techniques of this disclosure.

FIG. 5 is a flow diagram illustrating an example process for determining a risk score for a communication indicative of a likelihood that the communication is fraudulent, in accordance with the techniques of this disclosure. The example process of FIG. 5 may be performed by fraud prevention system 214 of FIG. 2, including DIVA indexer 10, e.g., running on computing system 300 of FIG. 3, emotion variance model 220, e.g., running on computing system 400 of FIG. 4, and fraud risk system 222.

Fraud prevention system 214 associated with an organization or business receives customer data representing a current customer communication from a customer that can be used to determine a likelihood that the current communication is fraudulent (502). The customer may send the current communication from user device 206 to one or more servers or other computing devices of customer personalization system 214. The current communication may be in the form of a text, call, letter, email, or other form of communication.

Once fraud prevention system 214 receives the current communication, data pre-processor 2 may pre-process the current communication into communication data for further processing (504). The communication data may be in plain text format, where data pre-processor 2 digitally transcribes audio messages into plain text format, or an employee of the organization manually transcribes the audio message into plain text format. In some examples, data pre-processor 2 transcribes visual data (from scanned documents, pdf files, image files etc.) into plain text format, or an employee of the organization manually transcribes visual data into plain text format. Data pre-processor 2 may include a speech recognition model, e.g., a natural language processing (NLP) engine, configured to convert audio customer service inquiries to plain text data via natural language processing. In other examples, data pre-processor 2 may include a text image recognition model configured to convert hand- or typewritten customer service inquiries to plain text data or text-based annotation data.

DIVA indexer 10 then receives the processed communication data as input to the machine learning algorithms within DIVA indexer 10 (506). DIVA indexer 10 comprises multiple machine learning models, including a determination model 12, inquisitiveness model 14, valence model 16, and aggression model 18. The machine learning models within DIVA indexer 10 may accept plain text or text-based annotation data as input, where the communication data received is associated with a single communication submitted by the customer.

DIVA indexer 10 generates a current set of emotion factor values, where each of the machine learning models within DIVA indexer 10 is configured to generate a single emotion factor value as output (508). Each of the emotion factor values may be indicative of an emotive intensity present in the communication data. For example, determination model 12 may generate a determination value comprising an integer between −2 and 2 (inclusive). A determination value of −2 may indicate that the customer communication conveys a low determination, where the customer may feel undecided on an issue. A determination value of 2 may indicate that the customer communication conveys a high determination value, where the customer may feel fixated on an issue. Similarly, inquisitiveness model 14 may generate an inquisitiveness value, valence model 16 may generate a valence value, and aggression model 18 may generate an aggression value, where each emotion factor value may be an integer between −2 and 2 (inclusive), representing the intensity of the respective emotion as conveyed in the customer communication. The four emotion factor values may be saved in an emotion factor index database 22 as associated with the communication data and the customer who sent the current communication.

Emotion variance model 220 then retrieves one or more sets of emotion factor values associated with the customer from the emotion factor index database 22, or may receive the one or more sets of emotion factor values from DIVA indexer 10 as input (510). Emotion variance model 220 may be a machine learning model or a business rule-based model. In some examples, emotion variance model retrieves the current set of emotion factor values, as well as historic sets of emotion factor values from emotion factor index database 22. In some examples, emotion variance model 220 calculates a delta set of emotion factor values for the current communication based on the current set of emotion factor values and historic sets of emotion factor values as described with respect to FIG. 4 above. In some examples, emotion variance model 220 is a machine learning model that accepts a delta set of emotion factor values as input, and fraud prevention system 214 may calculate the delta set of emotion factor values to apply to emotion variance model 220 as input.

Emotion variance model 220 then classifies the current communication into an emotional fraud category based on the one or more sets of emotion factor values (512). In some examples emotion variance model 220 is a machine learning model, trained as described below with respect to FIG. 7 to classify a communication into an emotional fraud category indicative of a likelihood that the current communication is fraudulent. In some examples, the emotional fraud category may be a number (e.g., zero or one, between zero and ten), where higher numbers reflect a higher probability that the current communication associated with the emotion factor values is fraudulent. In some examples, the emotional fraud category may be a text string (e.g., "potentially fraudulent," "non-fraudulent," "highly likely fraudulent") indicative of whether the current communication may be fraudulent.

In some examples emotion variance model 220 may be a machine learning model. In some examples, emotion variance model 220 may accept a set of current emotion factor values from a current communication as input, and classify the current communication into an emotional fraud category based on the set of current emotion factor values. In some examples, emotion variance model 220 may accept a delta set of emotion factor values from a current communication as input and classify the current communication into an emotional fraud category based on the delta set of emotion factor values.

In some examples, emotion variance model 220 is a business rule-based model for classifying a current communication into an emotional fraud category. In some examples, emotion variance model 220 may compare a current set of emotion factor values for a current communication sent by a customer to a pattern set of emotion factor values known to be indicative of fraud. Emotion variance model 220 may classify the current communication into a fraud category based on how similar the current set of emotion factor values is to the pattern set of emotion factor values, where current sets of emotion factor values that are more similar to the pattern set of emotion factor values result in emotion variance model 220 classifying the current communication into an emotional fraud category more likely to be indicative of fraud.

In some examples, a business rule-based emotion variance model 220 may calculate one or more emotion factor delta values or a delta set of emotion factor values and classify the current communication into an emotional fraud category based on one or more of the delta values exceeding a threshold. There may be one or more thresholds for different emotion factor delta values, or one or more thresholds for the same emotion factor delta value where higher thresholds are indicative of a higher likelihood of fraud. Emotion variance model 220 may classify a first communication into an emotional fraud category indicative of a higher likelihood of fraud than a second communication where the first communication has emotion factor delta values that exceed higher thresholds than the emotion factor values for the second communication.

Emotion variance model 220 may output the emotional fraud category to fraud risk system 222 to determine a risk score for the current communication indicative of a probability that the current communication is fraudulent. Fraud risk system 222 may determine a risk score for the current communication indicative of a probability that the current communication is fraudulent based on at least the emotional fraud category for the current communication (514). In some examples, fraud risk system 222 may determine a risk score based on other input as well, like a risk assessment received from fraud detection system 217 indicating a risk that the current communication is fraudulent based on fraud markers.

Risk score unit 226 of fraud risk system 222 may determine a risk score for a current communication based on one or more of the risk assessment, the emotional fraud category, and other data indicative of fraud. The risk score may consist of a percentage likelihood that the current communication is fraudulent. Fraud risk system 222 may transmit the risk score to one or more agent devices 224 for use in determining how to handle the current communication in real-time. For example, fraud risk system 222 may send a risk score to agent device 224 indicating an eighty-six percent chance that the current communication is fraudulent. An agent operating agent device 224 may decide to freeze the accounts of the customer associated with the current communication. In some examples, fraud risk system 222 may determine that the risk score is high enough to automatically freeze the accounts of the customer associated with the current communication.

Figure 6:
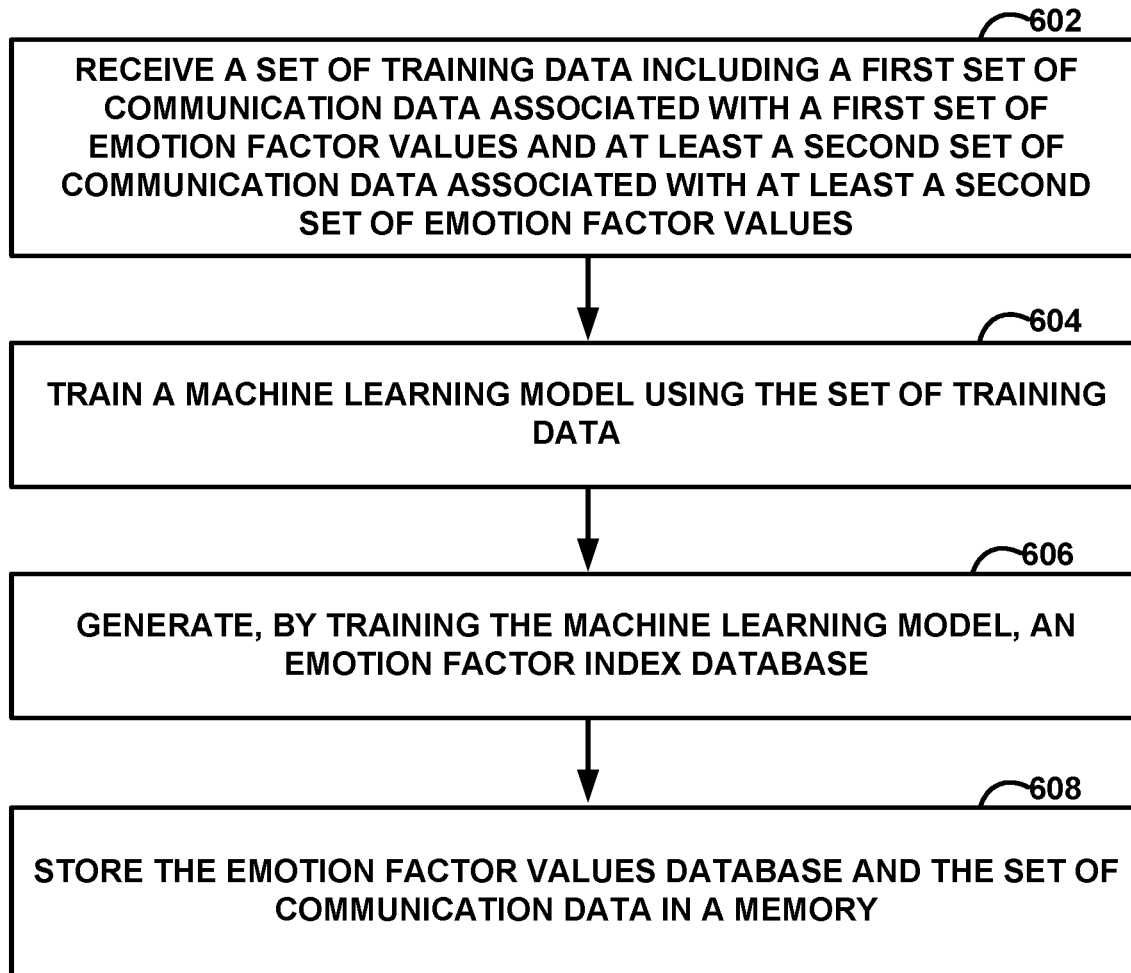
FIG. 6 is a flow diagram illustrating an example process for training an emotion-based indexer machine learning model, in accordance with the techniques of this disclosure.

FIG. 6 is a flow diagram illustrating an example process for training an emotion-based indexer machine learning model, in accordance with the techniques of this disclosure. The example operation of FIG. 6 is described with respect to computing system 300 of FIG. 3 including DIVA indexer 10 and training unit 320. The emotion-based indexer may comprise determination model 12, inquisitiveness model 14, valence model 16, and aggression model 18 within DIVA indexer 10. Each model within DIVA indexer 10 may need to be trained individually with communication data labeled with their respective emotion factor values.

Training unit 320 may receive a set of training data 312 including data indicative of a first set of communication data associated with a first set of emotion factor values and at least a second set of communication data associated with a second set of emotion factor values (602). The sets of emotion factor values may each be comprised of a determination value, an inquisitiveness value, a valence value, and an aggression value, where each emotion factor value is comprised of an integer between negative two and two inclusive. In some examples, the first set of emotion factor values has different integer values than the second set of emotion factor values. In some examples, the set of communication data associated with the first set of emotion factor values may be approximately equal in size to the set of communication data associated with the second set of emotion factor values.

Training unit 320 may train the machine learning models within DIVA indexer 10 using training data 312 (604). Determination model 12 may be trained to determine a determination value based on input communication data representing a message. A machine learning model may be trained using a training process to create a data-specific model, such as determination model 12, based on training data 312. After the training process, determination model 12 may be capable of outputting a determination value representing a level of determination emotion in a message based on an input of communication data. The training process may implement a set of training data (e.g., training data 312) to create determination model 12.

Training data 312 may include a plurality of sets of communication data and emotion factor values as described above, wherein the determination values from the sets of emotion factor values are used to train determination model 12. The plurality of sets of communication data may include a group of communication data labeled with a determination value of negative 2, a group of communication data labeled with a determination value of negative one, a group of communication data labeled with a determination value of zero, a group of communication data labeled with a determination value of one, and a group of communication data labeled with a determination value of two, where each group of communication data of the plurality of sets of communication data is known to be labeled with a determination value of negative two, negative one, zero, one, or two. In one example, training data 312 contains data representing about equal numbers of sets of communication data labeled with determination values of each number negative two through two. In another example, training data 312 contains data including a greater number of sets of communication data labeled with a determination value of two than sets of communication data labeled with a determination value of zero. Other examples are contemplated wherein training data 312 contains data including an equal to or greater number of sets of communication data labeled with any particular determination value than a number of sets of communication data labeled with any other particular determination value. Training unit 320 may access training data 312 stored in storage units 310, and training unit 320 may train determination model 12 using training data 312.

Inquisitiveness model 14 may be trained to determine an inquisitiveness value based on input communication data representing a message. A machine learning model may be trained using a training process to create a data-specific model, such as inquisitiveness model 14, based on training data 312. After the training process, inquisitiveness model 14 may be capable of outputting an inquisitiveness value representing a level of inquisitiveness emotion in a message based on an input of communication data. The training process may implement a set of training data (e.g., training data 312) to create inquisitiveness model 14.

Training data 312 may include a plurality of sets of communication data and emotion factor values as described above, wherein the inquisitiveness values from the sets of emotion factor values are used to train inquisitiveness model 14. The plurality of sets of communication data may include a group of communication data labeled with an inquisitiveness value of negative 2, a group of communication data labeled with an inquisitiveness value of negative one, a group of communication data labeled with an inquisitiveness value of zero, a group of communication data labeled with an inquisitiveness value of one, and a group of communication data labeled with an inquisitiveness value of two, where each group of communication data of the plurality of sets of communication data is known to be labeled with an inquisitiveness value of negative two, negative one, zero, one, or two. In one example, training data 312 contains data representing about equal numbers of sets of communication data labeled with inquisitiveness values of each number negative two through two. In another example, training data 312 contains data including a greater number of sets of communication data labeled with an inquisitiveness value of two than sets of communication data labeled with an inquisitiveness value of zero. Other examples are contemplated wherein training data 312 contains data including an equal to or greater number of sets of communication data labeled with any particular inquisitiveness value than a number of sets of communication data labeled with any other particular inquisitiveness value. Training unit 320 may access training data 312 stored in storage units 310, and training unit 320 may train inquisitiveness model 14 using training data 312.

Valence model 16 may be trained to determine a valence value based on input communication data representing a message. A machine learning model may be trained using a training process to create a data-specific model, such as valence model 16, based on training data 312. After the training process, valence model 16 may be capable of outputting a valence value representing a level of valence emotion in a message based on an input of communication data. The training process may implement a set of training data (e.g., training data 312) to create valence model 16.

Training data 312 may include a plurality of sets of communication data and emotion factor values as described above, wherein the valence values from the sets of emotion factor values are used to train valence model 16. The plurality of sets of communication data may include a group of communication data labeled with a valence value of negative 2, a group of communication data labeled with a valence value of negative one, a group of communication data labeled with a valence value of zero, a group of communication data labeled with a valence value of one, and a group of communication data labeled with a valence value of two, where each group of communication data of the plurality of sets of communication data is known to be labeled with a valence value of negative two, negative one, zero, one, or two. In one example, training data 312 contains data representing about equal numbers of sets of communication data labeled with valence values of each number negative two through two. In another example, training data 312 contains data including a greater number of sets of communication data labeled with a valence value of two than sets of communication data labeled with a valence value of zero. Other examples are contemplated wherein training data 312 contains data including an equal to or greater number of sets of communication data labeled with any particular valence value than a number of sets of communication data labeled with any other particular valence value. Training unit 320 may access training data 312 stored in storage units 310, and training unit 320 may train valence model 16 using training data 312.

Aggression model 18 may be trained to determine an aggression value based on input communication data representing a message. A machine learning model may be trained using a training process to create a data-specific model, such as aggression model 18, based on training data 312. After the training process, aggression model 18 may be capable of outputting an aggression value representing a level of aggression emotion in a message based on an input of communication data. The training process may implement a set of training data (e.g., training data 312) to create aggression model 18.

Training data 312 may include a plurality of sets of communication data and emotion factor values as described above, wherein the aggression values from the sets of emotion factor values are used to train aggression model 18. The plurality of sets of communication data may include a group of communication data labeled with an aggression value of negative 2, a group of communication data labeled with an aggression value of negative one, a group of communication data labeled with an aggression value of zero, a group of communication data labeled with an aggression value of one, and a group of communication data labeled with an aggression value of two, where each group of communication data of the plurality of sets of communication data is known to be labeled with an aggression value of negative two, negative one, zero, one, or two. In one example, training data 312 contains data representing about equal numbers of sets of communication data labeled with aggression values of each number negative two through two. In another example, training data 312 contains data including a greater number of sets of communication data labeled with an aggression value of two than sets of communication data labeled with an aggression value of zero. Other examples are contemplated wherein training data 312 contains data including an equal to or greater number of sets of communication data labeled with any particular aggression value than a number of sets of communication data labeled with any other particular aggression value. Training unit 320 may access training data 312 stored in storage units 310, and training unit 320 may train aggression model 18 using training data 312.

By training the machine learning models within DIVA indexer 10, training unit 320 may generate an emotion factor index database 22 (606). The emotion factor index database 22 may include a plurality of emotion factor value sets, where each emotion factor value set of the plurality of emotion factor value sets corresponds to a respective message or communication data. Communication data may include words of the English language or other languages, single numerals, groups of single numerals, numerical strings, groups of numerical strings, single characters, groups of single characters, character strings, or groups of character strings in plain text format. As such, using emotion factor index database 22, the machine learning models within DIVA indexer 10 may determine a set of emotion factor values for a message or communication data. Training unit 320 may store emotion factor index database 22 in storage units 310 (608).

Figure 7:
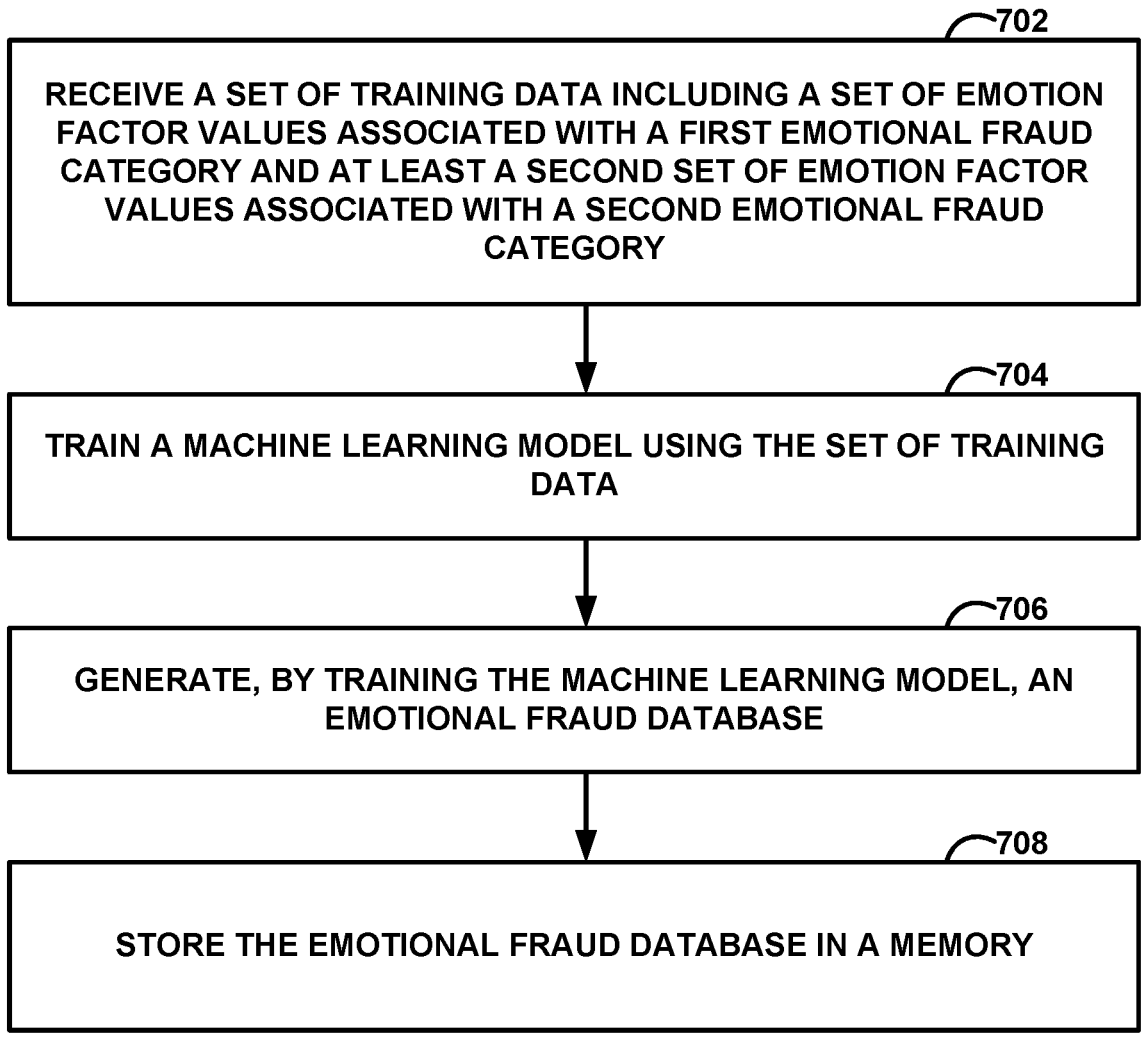
FIG. 7 is a flow diagram illustrating an example process for training a machine learning emotion variance model, in accordance with the techniques of this disclosure.

FIG. 7 is a flow diagram illustrating an example process for training a machine learning emotion variance model 220, in accordance with the techniques of this disclosure. The example operation of FIG. 7 is described with respect to computing system 400 of FIG. 4 including machine learning model, emotion variance model 220, and training unit 420.

In a first example, an emotion variance model 220 machine learning model may be trained to classify a communication into an emotional fraud category indicative of a likelihood that the communication is fraudulent based on a set of emotion factor values for the communication data associated with the communication.

In a second example, emotion variance model 220 machine learning model may be trained to classify a communication into an emotional fraud category indicative of a likelihood that the communication is fraudulent based on a delta set of emotion factor values for the communication data associated with the communication.

In a first example, training unit 420 may receive a set of training data 412 including a group of sets of emotion factor values associated with customer communications and labeled with a first emotional fraud category, and a group of sets of emotion factor values associated with customer communications and labeled with a second emotional fraud category (702). In some examples, the group of sets of emotion factor values labeled with the first emotional fraud category may be approximately equal in size to the group of sets of emotion factor values labeled with the second emotional fraud category.

In a second example, training unit 420 may receive a set of training data 412 including a group of delta sets of emotion factor values associated with customer communications and labeled with a first emotional fraud category, and a group of delta sets of emotion factor values associated with customer communications and labeled with a second emotional fraud category (702). In some examples, the group of delta sets of emotion factor values labeled with the first emotional fraud category may be approximately equal in size to the group of delta sets of emotion factor values labeled with the second emotional fraud category.

Training unit 420 may train emotion variance model 220 using training data 412 (704). In a first example, emotion variance model 220 may be trained to classify a communication into an emotional fraud category based on an input set of emotion factor values associated with the message. In a second example, emotion variance model 220 may be trained to classify a communication into an emotional fraud category based on an input delta set of emotion factor values associated with the message. A machine learning algorithm may be trained using a training process to create a data-specific model, such as emotion variance model 220 based on training data 412. After the training process, emotion variance model 220 may be capable of classifying a communication into an emotional fraud category based on a set of emotion factor values in a first example, or emotion variance model 220 may be capable of classifying a communication into an emotional fraud category based on a delta set of emotion factor values in a second example. The training process may implement a set of training data (e.g., training data 412) to create the emotion variance model 220.

In a first example, training data 412 may include data indicative of a plurality of sets of emotion factor values labeled with a plurality of emotional fraud categories, wherein the plurality of sets of emotion factor values labeled with a plurality of emotional fraud categories comprises a first set of emotion factor values labeled with a first emotional fraud category and at least a second set of emotion factor values labeled with a second emotional fraud category. The plurality of sets of emotion factor values may include a particular number of groups (e.g., ten groups) of sets of emotion factor values where each of the groups includes data that is labeled with a particular emotional fraud category. In one example, training data 412 contains data representing about equal numbers of sets of emotion factor values labeled with each emotional fraud category. In another example, training data 412 contains data including a greater number of sets of emotion factor values labeled with a first emotional fraud category than a number of sets of emotion factor values labeled with a second emotional fraud category. Other examples are contemplated wherein training data 412 contains data including a greater number of sets of emotion factor values labeled with any particular emotional fraud category than a number of sets of emotion factor values labeled with any other particular emotional fraud category. Training unit 420 may access training data 412 stored in storage units 410, and training unit 420 may train the emotion variance model 220 using training data 412.

In a second example, training data 412 may include data indicative of a plurality of delta sets of emotion factor values labeled with a plurality of emotional fraud categories, wherein the plurality of delta sets of emotion factor values labeled with a plurality of emotional fraud categories comprises a first delta set of emotion factor values labeled with a first emotional fraud category and at least a second delta set of emotion factor values labeled with a second emotional fraud category. The plurality of delta sets of emotion factor values may include a particular number of groups (e.g., ten groups) of delta sets of emotion factor values where each of the groups includes data that is labeled with a particular emotional fraud category. In one example, training data 412 contains data representing about equal numbers of delta sets of emotion factor values labeled with each emotional fraud category. In another example, training data 412 contains data including a greater number of delta sets of emotion factor values labeled with a first emotional fraud category than a number of delta sets of emotion factor values labeled with a second emotional fraud category. Other examples are contemplated wherein training data 412 contains data including a greater number of delta sets of emotion factor values labeled with any particular emotional fraud category than a number of delta sets of emotion factor values labeled with any other particular emotional fraud category. Training unit 420 may access training data 412 stored in storage units 410, and training unit 420 may train the emotion variance model 220 using training data 412.

By training emotion variance model 220, training unit 420 may generate an emotional fraud database 416 (706). The emotional fraud database 416 may include a plurality of emotional fraud categories, where each emotional fraud category of the plurality of emotional fraud categories corresponds to one or more sets of emotion factor values associated with customer communications. Each emotional fraud category of the plurality of emotional fraud categories is associated with a likelihood that a communication is fraudulent. Using emotional fraud database 416, emotion variance model 220 may classify a communication into an emotional fraud category indicative of a likelihood that the communication is fraudulent. Training unit 420 may store emotional fraud database 416 in storage units 410 (708).

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
   a memory; and
   one or more processors in communication with the memory and configured to:
   receive a set of emotion factor values for communication data of a current communication associated with a customer, wherein each emotion factor value of the set of emotion factor values indicates a measure of a different emotion in the current communication;
   classify, using an emotion variance model running on the one or more processors, the current communication into an emotional fraud category based on the set of emotion factor values for the current communication associated with the customer, wherein the emotion variance model comprises a machine learning model;
   determine a risk score for the current communication indicative of a probability that the current communication is fraudulent based on at least the emotional fraud category for the current communication;
   determine an accuracy of the emotion variance model based on example sets of emotion factor values corresponding to known emotional fraud categories; and
   based on the accuracy not exceeding a threshold accuracy value, re-train the emotion variance model based on an updated set of training data, wherein the updated set of training data includes an updated plurality of customer communications, wherein each customer communication in the updated plurality of customer communications comprises a set of emotion factor values and a label indicating an emotional fraud category for the communication, and wherein the updated plurality of customer communications includes the current communication.

2. The computing system of claim 1, wherein the one or more processors are further configured to:
   receive the communication data of the current communication;
   apply the communication data to an emotion-based indexer as input, wherein the emotion-based indexer includes a set of machine learning models, each machine learning model trained to determine the measure of the particular emotion factor in the current communication;
   generate, as output from the emotion-based indexer, the set of emotion factor values for the current communication; and
   store the set of emotion factor values for the current communication in a database.

3. The computing system of claim 1, wherein the one or more processors are configured to classify the current communication into the emotional fraud category based on the set of emotion factor values for the current communication and one or more historic sets of emotion factor values stored in a database, wherein the one or more historic sets of emotion factor values correspond to communication data of one or more historic communications associated with the customer over time, the historic communications occurring prior to the current communication.

4. The computing system of claim 3, wherein to classify the current communication, the one or more processors are configured to:
   compute an average set of emotion factor values from the historic sets of emotion factor values for the historic communications associated with the customer over time; and
   classify the current communication into the emotional fraud category based on the average set of emotion factor values for the customer over time.

5. The computing system of claim 4, wherein the one or more processors are further configured to:
   determine a set of delta values for the set of emotion factor values by calculating a difference between each emotion factor value of the set of emotion factor values for the current communication and each corresponding emotion factor value of the average set of emotion factor values for the historic communications; and
   classify the current communication into the emotional fraud category in response to one or more delta values of the set of delta values exceeding a threshold.

6. The computing system of claim 4, wherein the one or more processors are further configured to:
   determine at least one delta value for at least one emotion factor value of the set of emotion factor values by calculating a difference between a particular emotion factor value for the current communication and a corresponding particular emotion factor value of the average set of emotion factor values for the historic communications; and classify the current communication into the emotional fraud category based on the delta value for the particular emotion factor value exceeding a threshold.

7. The computing system of claim 5, wherein to classify the communication, the one or more processors are configured to:
apply the set of delta values for the set of emotion factor values for the current communication to the emotion variance model as input; and
indicate, as output from the emotion variance model, the emotional fraud category for the current communication.

8. The computing system of claim 7, wherein the one or more processors are configured to:
create a first set of training data that includes a first plurality of customer communications, wherein each customer communication in the first plurality of customer communications comprises a set of delta values and a label indicating an emotional fraud category for the communication; and
train the machine learning model based on the first set of training data.

9. The computing system of claim 1, wherein to classify the communication, the one or more processors are configured to:
apply the set of emotion factor values for the current communication to the emotion variance model as input; and
indicate, as output from the emotion variance model, the emotional fraud category for the customer.

10. The computing system of claim 1, wherein the one or more processors are configured to:
create a first set of training data that includes a first plurality of customer communications, wherein each customer communication in the first plurality of customer communications comprises a set of emotion factor values and a label indicating an emotional fraud category for the communication; and
train the machine learning model based on the first set of training data.

11. The computing system of claim 1, wherein to classify the current communication, the one or more processors are configured to:
determine a pattern set of emotion factor values that corresponds to fraudulent communications;
determine a similarity between the pattern set of emotion factor values and the set of emotion factor values for the current communication; and
classify the current communication into the emotional fraud category based on the similarity.

12. The computing system of claim 1, wherein to determine the risk score for the current communication, the one or more processors are further configured to:
receive a risk assessment of the current communication from a preliminary fraud detection system; and
determine the risk score for the current communication based on at least the risk assessment and the emotional fraud category for the current communication.

13. The computing system of claim 1, wherein the one or more processors are further configured to transmit the risk score to one or more agent devices for use in determining how to handle the current communication.

14. The computing system of claim 1, wherein the updated set of training data comprises a first updated set of training data, wherein the updated plurality of customer communications comprises a first plurality of customer communications, and wherein the one or more processors are configured to periodically re-train the emotion variance model based on a second updated set of training data, wherein the second updated set of training data includes a second updated plurality of customer communications including customer communications received since the emotion variance model was last trained, wherein each customer communication in the second updated plurality of customer communications comprises a set of emotion factor values and a label indicating an emotional fraud category for the communication.

15. A method comprising:
receiving, by one or more processors, a set of emotion factor values for communication data of a current communication associated with a customer, wherein each emotion factor value of the set of emotion factor values indicates a measure of a different emotion in the current communication;
classifying, using an emotion variance model running on the one or more processors, the current communication into an emotional fraud category based on the set of emotion factor values for the current communication associated with the customer, wherein the emotion variance model comprises a machine learning model;
determining a risk score for the current communication indicative of a probability that the current communication is fraudulent based on at least the emotional fraud category for the current communication;
determining an accuracy of the emotion variance model based on example sets of emotion factor values corresponding to known emotional fraud categories; and
based on the accuracy not exceeding a threshold accuracy value, re-training the emotion variance model based on an updated set of training data, wherein the updated set of training data includes an updated plurality of customer communications, wherein each customer communication in the updated plurality of customer communications comprises a set of emotion factor values and a label indicating an emotional fraud category for the communication, and wherein the updated plurality of customer communications includes the current communication.

16. The method of claim 15, wherein classifying the current communication into the emotional fraud category is further based on the set of emotion factor values for the current communication and one or more historic sets of emotion factor values stored in a database, wherein the one or more historic sets of emotion factor values correspond to communication data of one or more historic communications associated with the customer over time, the historic communications occurring prior to the current communication.

17. The method of claim 16, wherein classifying the current communication further comprises:
computing an average set of emotion factor values from the historic sets of emotion factor values for the historic communications associated with the customer over time;
determining a set of delta values for the set of emotion factor values by calculating a difference between each emotion factor value of the set of emotion factor values for the current communication and each corresponding emotion factor value of the average set of emotion factor values for the historic communications; and
classifying the current communication into the emotional fraud category in response to one or more delta values of the set of delta values exceeding a threshold.

18. The method of claim 17, wherein classifying the current communication further comprises:
- applying the set of delta values for the set of emotion factor values for the current communication to the emotion variance model as input; and
- indicating, as output from the emotion variance model, the emotional fraud category for the customer.

19. The method of claim 18 further comprising:
- creating a first set of training data that includes a first plurality of customer communications, wherein each customer communication in the first plurality of customer communications comprises a set of delta values and a label indicating an emotional fraud category for the customer communication; and
- training the machine learning model based on the set of training data.

20. The method of claim 15 wherein classifying the communication further comprises:
- applying the set of emotion factor values for the current communication to the emotion variance model as input; and
- indicating, as output from the emotion variance model, the emotional fraud category for the customer.

21. The method of claim 15, further comprising:
- creating a first set of training data that includes a first plurality of customer communications, wherein each customer communication in the first plurality of customer communications comprises a set of emotion factor values and a label indicating an emotional fraud category for the communication; and
- training the machine learning model based on the first set of training data.

22. A non-transitory computer-readable medium comprising instructions that, when executed, cause one or more processors to:
- receive a set of emotion factor values for communication data of a current communication associated with a customer, wherein each emotion factor value of the set of emotion factor values indicates a measure of a different emotion in the current communication;
- classify, using an emotion variance model running on the one or more processors, the current communication into an emotional fraud category based on the set of emotion factor values for the current communication associated with the customer, wherein the emotion variance model comprises a machine learning model;
- determine a risk score for the current communication indicative of a probability that the current communication is fraudulent based on at least the emotional fraud category for the current communication;
- determine an accuracy of the emotion variance model based on example sets of emotion factor values corresponding to known emotional fraud categories; and
- based on the accuracy not exceeding a threshold accuracy value, re-train the emotion variance model based on an updated set of training data, wherein the updated set of training data includes an updated plurality of customer communications, wherein each customer communication in the updated plurality of customer communications comprises a set of emotion factor values and a label indicating an emotional fraud category for the communication, and wherein the updated plurality of customer communications includes the current communication.

* * * * *